(12) United States Patent
Murakami

(10) Patent No.: US 12,173,912 B2
(45) Date of Patent: Dec. 24, 2024

(54) VENTILATION AND AIR-CONDITIONING STRUCTURE AND VENTILATION AND AIR-CONDITIONING METHOD

(71) Applicant: Eco Factory Co., Ltd., Kumamoto (JP)

(72) Inventor: Takanobu Murakami, Kumamoto (JP)

(73) Assignee: Eco Factory Co., Ltd., Kumamoto (JP)

(*) Notice: Subject to any disclaimer, the term of this patent is extended or adjusted under 35 U.S.C. 154(b) by 377 days.

(21) Appl. No.: 17/414,162

(22) PCT Filed: May 11, 2020

(86) PCT No.: PCT/JP2020/018782
§ 371 (c)(1),
(2) Date: Jun. 15, 2021

(87) PCT Pub. No.: WO2021/009999
PCT Pub. Date: Jan. 21, 2021

(65) Prior Publication Data
US 2022/0128245 A1    Apr. 28, 2022

(30) Foreign Application Priority Data
Jul. 18, 2019   (JP) ................................ 2019-132713

(51) Int. Cl.
*F24F 1/027*    (2019.01)
*B01D 46/00*    (2022.01)
(Continued)

(52) U.S. Cl.
CPC .......... *F24F 1/027* (2013.01); *B01D 46/0028* (2013.01); *B01D 46/4263* (2013.01);
(Continued)

(58) Field of Classification Search
CPC ...... F24F 1/60; F24F 7/10; F24F 13/30; F24F 1/0035; F24F 1/0323; F24F 1/0038;
(Continued)

(56) References Cited

FOREIGN PATENT DOCUMENTS

CN    106133451 A  * 11/2016  ................ F24F 1/02
CN    206018915 U    3/2017
(Continued)

*Primary Examiner* — Frantz F Jules
*Assistant Examiner* — Martha Tadesse
(74) *Attorney, Agent, or Firm* — Heedong Chae; Lucem, PC

(57) ABSTRACT

A ventilation air conditioning structure including a room that has a floor portion to a fourth wall portion, a first wall portion to be a building outer wall in which an air supply opening is formed in a vicinity of a third wall portion, and an air exhaust opening that is formed in a vicinity of the fourth wall portion. The ventilation air conditioning structure also includes an air conditioner that is disposed inside the room and where at least one of air sending openings of a room interior unit is capable of sending air in a direction of a second wall portion, and an external-air conditioner that is disposed outside the room. The external-air conditioner includes heat exchangers that are incorporated in a refrigerant circuit of the air conditioner via a branched pipe that is branched from a refrigerant piping and a casing that houses the heat exchangers.

10 Claims, 14 Drawing Sheets

(51) Int. Cl.
*B01D 46/42* (2006.01)
*F24F 1/0038* (2019.01)
*F24F 1/0323* (2019.01)
*F24F 1/035* (2019.01)
*F24F 11/81* (2018.01)
*F24F 12/00* (2006.01)
*F24F 13/20* (2006.01)
*F24F 11/30* (2018.01)

(52) U.S. Cl.
CPC .......... *F24F 1/0038* (2019.02); *F24F 1/0323* (2019.02); *F24F 1/035* (2019.02); *F24F 11/81* (2018.01); *F24F 12/00* (2013.01); *F24F 13/20* (2013.01); *B01D 2279/50* (2013.01); *F24F 11/30* (2018.01); *F24F 2221/17* (2013.01); *F24F 2221/20* (2013.01)

(58) Field of Classification Search
CPC ....... F24F 11/81; F24F 1/035; B01D 46/0028; B01D 46/4263
See application file for complete search history.

(56) References Cited

FOREIGN PATENT DOCUMENTS

| | | | | |
|---|---|---|---|---|
| CN | 206055816 U | 3/2017 | | |
| CN | 208998266 U | 6/2019 | | |
| EP | 2980516 A1 * | 2/2016 | ........... | F28D 1/0435 |
| JP | 1987-019551 | 2/1987 | | |
| JP | 05-203184 A | 8/1993 | | |
| JP | H05203184 A * | 8/1993 | | |
| JP | 2001-012763 A | 1/2001 | | |
| JP | 2001-221453 A | 8/2001 | | |
| JP | 2007-127289 A | 5/2007 | | |
| JP | 4294784 | 4/2009 | | |
| JP | 2010-127516 A | 6/2010 | | |
| JP | 2014-104376 A | 6/2014 | | |
| JP | 6407466 B1 | 10/2018 | | |
| KR | 10-2009-0034595 A | 4/2009 | | |
| WO | WO-2007026387 A2 * | 3/2007 | ............... | A61L 9/16 |

* cited by examiner

VENTILATION AND AIR-CONDITIONING STRUCTURE AND VENTILATION AND AIR-CONDITIONING METHOD

TECHNICAL FIELD

The present invention relates to a ventilation air conditioning structure and a ventilation air conditioning method. In detail, the invention relates to a ventilation air conditioning structure and a ventilation air conditioning method with which installation and maintenance in either a newly built or existing building are easy, suppression of electric power consumption amount of an air conditioner is enabled by use of an external-air conditioner interlocked with the air conditioner being in air conditioning operation inside a room, and thermoregulated external air that has been heated or cooled by the external-air conditioner (hereinafter referred to as "conditioned external air") is enabled to be circulated inside the room using a flow of heated or cooled air (hereinafter referred to as "conditioned air") sent from the air conditioner.

BACKGROUND ART

Patients of sick house syndrome, apparently related to prevalence of buildings with highly airtight structures, are being observed in large numbers in recent years. As a countermeasure to this problem, it was made mandatory, by the amended Building Standards Act put into force on Jul. 1, 2003, to install a mechanical ventilation equipment in all buildings as a rule.

As a mechanical ventilation equipment, there is an equipment with which an external-air conditioner is provided in middle of an introducing passage to reduce a temperature difference between introduced external air and room interior air in introducing external air into a room interior and, for example, an air conditioning equipment such as that stated in Patent Literature 1 below has been proposed. This air conditioning equipment is shown in FIG. 14.

The air conditioning equipment 9 shown in FIG. 14 has an external-air conditioner 91 that is installed at a room exterior and processes external air OA and a sensible heat exchanger 93 that is installed in a vicinity of a return air intake 92 arranged to recover air RA supplied into a room interior R via the external-air conditioner 91. Here, the sensible heat exchanger 93 performs heat exchange with the recovered air RA and supplies the heat-exchanged air SA from an air supply opening into the room interior R. Also, the external-air conditioner 91 includes a cooling coil 911, a heating coil 912, a humidifier 913, and a blower 914 and thermoregulates, humidifies, and sends the introduced external air OA toward the room interior R side.

CITATION LIST

Patent Literature

Patent Literature 1: Japanese Patent No. 4294784

SUMMARY OF INVENTION

Technical Problem

Incidentally, with the air conditioning equipment 9, the external-air conditioner 91 is installed in a ceiling space (room exterior at the ceiling side) such that its conditioner body would not be an obstacle (see paragraph [0019] and FIG. 2 of Patent Literature 1). Forming or installation of circulation passages 94a and 94b arranged to introduce and deliver the conditioned external air into and out of the room interior R is also necessary.

It is thus difficult to install a cumbersome apparatus such as the air conditioning equipment 9 a posteriori in an existing building and further, maintenance, etc., after installation is difficult regardless of installation in either a newly built or existing building.

Further, the external-air conditioner 91 includes the blower 914 and also requires a mechanism for circulating a heat medium and thus electric power is required to make the external-air conditioner 91 operate. Also, ordinarily, an air conditioner is also installed in the room interior and in such a case, the two units of the external-air conditioner 91 and the air conditioner are made to run such that much electric power becomes inevitably necessary for ventilation and air conditioning.

The present invention has been made in consideration of the aforementioned circumstances, and an object thereof is to provide a ventilation air conditioning structure and a ventilation air conditioning method with which installation and maintenance in either a newly built or existing building are easy, suppression of electric power consumption amount of an air conditioner is enabled by use of an external-air conditioner interlocked with the air conditioner being in air conditioning operation inside a room, and conditioned external air is enabled to be circulated inside the room using a flow of conditioned air from the air conditioner.

Solution to Problem

In order to achieve the aforementioned object, a ventilation air conditioning structure of the present invention includes a room structure body that has wall portions partitioning an interior and an exterior of a room inside a building, with at least one of the wall portions being an outer wall portion in contact with the outdoors and the outer wall portion having a first ventilation opening formed in a vicinity of one of adjacent wall portions and a second ventilation opening formed in a vicinity of another of the adjacent wall portions, an air conditioner that has a room interior unit disposed inside the room structure body and being capable of sending air, taken in from an air intake opening, in a direction of a wall portion facing the outer wall portion and a refrigerant piping connecting the room interior unit and a room exterior unit, and an external-air conditioner that is disposed at an outdoor side of the outer wall portion and has a heat exchanger provided in a refrigerant circuit of the air conditioner via a branched pipe branched from the refrigerant piping and a casing housing the heat exchanger and having formed therein a first opening portion opening in a down direction and a second opening portion opening at a back portion to be in an outer wall portion direction, with the second opening portion being in communication with either the first ventilation opening or the second ventilation opening.

Here, by having the wall portions that partitions the interior and the exterior of the room and by at least one of the wall portions being the outer wall portion that constitutes the outer wall of the building, the room structure body is made a structure having an internal space that is closed in an up direction and the down direction and at four sides between upper and lower sides and has at least one of the wall surfaces facing the outdoors.

The room structure body, by its outer wall portion having the first ventilation opening formed in the vicinity of one of the adjacent wall portions and the second ventilation opening formed in the vicinity of the other of the adjacent wall portions, is enabled to supply and exhaust air from and to the outdoors when one ventilation opening is arranged to be an air supply opening and the other ventilation opening is arranged to be an air exhaust opening. Also, the first ventilation opening and the second ventilation opening are in a configuration of being apart from each other at the outer wall portion such that fresh external air immediately after entering from the air supply side is made unlikely to be discharged immediately from the air exhaust side.

The air conditioner has the room interior unit disposed inside the room structure body and the refrigerant piping connecting the room interior unit and the room exterior unit such that heat exchange is performed by the refrigerant circulated between the room interior unit and the room exterior unit through the refrigerant piping and air inside the room structure body and is thereby enabled to supply the conditioned air that is cool air or warm air into the room structure body.

Also, the room interior unit, by being capable of sending the air taken in from the air intake opening in the direction of the wall portion facing the outer wall portion, is enabled to make fresh external air that entered from the ventilation opening to be at the air supply side ride on a flow of the conditioned air blown out from the room interior unit and hit the wall portion facing the outer wall portion. The air in which the external air and the conditioned air that hit the wall portion are mixed then diffuses in the up and down directions and right and left directions of the wall portion facing the outer wall portion and circulates inside the room structure body. Consequently, it is possible to suppress nonuniformity of concentrations of carbon dioxide, volatile organic compounds, and other chemical substances, etc., with which effects on a human body are of concern (hereinafter referred to as "concentrations of $CO_2$, etc.") at various locations inside the room structure body.

Here, the room interior unit (at least one unit in a case of plural units) is preferably positioned in a vicinity of the ventilation opening to be at the air supply side of the outer wall portion or at a ceiling and with this configuration, the fresh external air that entered from the ventilation opening to be at the air supply side rides readily on the flow of the conditioned air and it is possible to take conditioned external air that has been heated or cooled by the external-air conditioner into the room interior unit before much of its heat is lost. Also, for example, if the room interior unit has a plurality of air sending openings, it suffices for at least one thereof to be capable of sending air in the direction of the wall portion facing the outer wall portion.

By being disposed at the outdoor side of the outer wall portion, the external-air conditioner is easy to install in either a newly built or existing building in comparison to a case of installing in a ceiling space or under a floor and is also easy to maintain because of not being of a mode where an installed conditioner body is covered and hidden by the ceiling, a floor surface, etc. Also, the ventilation opening (for example, the first ventilation opening) that is in communication with a delivery opening of the external-air conditioner is arranged to be the air supply opening with respect to a room interior and the other ventilation opening (for example, the second ventilation opening) is arranged to be the air exhaust opening.

The ventilation opening to be at the air exhaust side discharges the air inside the room structure body and is capable of decreasing the concentrations of $CO_2$, etc., inside the room structure body. Although the ventilation opening to be at the air exhaust side is preferably of a forced air exhausting type, it may instead be of a natural ventilation type, such as a so-called louver (Venetian shutter), etc., for example, in a case such as where the external-air conditioner is of a forced air supplying type having a fan, etc.

Also, the external-air conditioner is disposed at the outdoor side of the outer wall portion and thereby the heat exchanger is enabled to heat or cool the external air until the external air passes through the ventilation opening to be at the air supply side to reduce a difference between a temperature of the external air and a temperature of the air inside the room (that is, is enabled to "perform external-air conditioning"). Here, the external-air conditioner may either be of a system for natural ventilation (by negative pressurization of an interior of the room structure body) that does not use an air supplying fan in taking in the external air or of a system for forced ventilation that uses an air supplying fan, etc.

By having the heat exchanger provided in the refrigerant circuit of the air conditioner via the branched pipe branched from the refrigerant piping, the external-air conditioner has a structure that is interlocked with operation of the air conditioner (a structure where the external-air conditioner itself does not use electric power). Running to perform external-air conditioning without requiring electric power and an intrinsic refrigerant for operation of a conditioner body is thereby made possible and contribution to energy saving is enabled.

By such external-air conditioning being performed, an extreme temperature difference between the conditioned external air entering the room structure body and the air inside the room structure body is eliminated and it is also possible to reduce a temperature difference with respect to a target temperature of the air conditioner. Consequently, in the air conditioner, a running time (hereinafter referred to as "rise time of the air conditioner") until a preset target temperature is reached and during which much electric power is consumed is shortened, an operation load is reduced, and by cooperation with the external-air conditioner, further contribution to energy saving is enabled.

By the heat exchanger being housed in the casing, the external-air conditioner is enabled to prevent exposure of the heat exchanger in an outdoor environment and protect the heat exchanger against deformation due to an external force and attachment of dirt. That is, the heat exchanger, which is a main portion, is protected and improved in weather resistance and durability, thus enabling elongation of product life.

The casing is capable of partitioning an interior and an exterior of a conditioner body of the external-air conditioner. Thereby, a flow passage for the external air is formed and it is possible to prevent the conditioned external air that has been heated, etc., by the heat exchanger from mixing with air outside the conditioner or prevent the conditioned external air from diffusing out of the conditioner.

The first opening portion formed in the casing becomes, during actuation, an introduction opening for the external air and is capable of introducing the external air and, due to being opened in the down direction, is also capable of making it unlikely for wind, rain, etc., to enter the casing. Also, the second opening portion formed in the back portion of the casing that is in the outer wall portion direction becomes, during actuation, a delivery opening for the external air that has been heat-exchanged by the heat exchanger (the conditioned external air) and is capable of delivering the conditioned external air out of the conditioner. In this process, the second opening portion is in communication with either the first ventilation opening or the second ventilation opening and, via whichever of the first ventilation opening or the second ventilation opening is in communication, it is made possible to make the conditioned external air reach the interior of the room structure body without letting it diffuse.

Also, if the external-air conditioner is arranged such that a plurality of the heat exchangers are disposed in parallel in the same direction and in a configuration of being substantially non-overlapping mutually in an air passage direction, respective refrigerant flow passages of the heat exchangers are separate systems, and the refrigerant is supplied according to each system by rebranched pipes further branched off the branched pipe, it is possible to efficiently increase a processable amount of the external air supplied into the room structure body.

Here, "configuration of being substantially non-overlapping mutually in an air passage direction" means a configuration where the heat exchangers do not overlap mutually in the air passage direction and is used in a meaning of including, for example, a configuration where portions of two heat exchangers overlap slightly as well as a configuration where two heat exchangers are disposed in parallel in a direction substantially perpendicular to the air passage direction and do not overlap at all (completely non-overlapping configuration).

For example, if the interior of the room structure body is completely closed and a number of people staying therein is large, the concentrations of $CO_2$, etc., inside the room structure body would obviously increase and furthermore, if the room structure body is spacious, a large amount of the external air must be taken in for ventilation. If in this case, the heat exchangers of the external-air conditioner are of the arrangement described above and a plurality thereof are disposed in parallel, it is possible to arrange a structure secured with a large opening area for the air supply opening and a larger amount of the external air can be conditioned and taken in.

Further, due to being a structure where the respective refrigerant flow passages of the heat exchangers are separate systems and the refrigerant is supplied according to each system by the rebranched pipes further branched off the branched pipe, resistance inside the flow passages inside the heat exchangers is lightened and a load applied to a compressor of an air conditioning apparatus is thus lightened in comparison, for example, to a single heat exchanger with which a refrigerant flow passage is of a single system and a surface area in the air passage direction is the same. In addition, due to the refrigerant flow passages inside the heat exchangers being short, it is possible to quicken a flow speed of the refrigerant and it is possible to increase a heat transfer effect.

Also, if an air filter apparatus having a ventilation opening filter sheet, a holding body that includes a frame body with which a central region is opened and a holding portion provided at a periphery of the frame body and locking and detachably holding an edge portion of the ventilation opening filter sheet, and a supporting frame body that is arranged to enable the holding body to be put in and taken out from a side and is capable of supporting the holding body that has been put in is disposed at a room interior side of whichever of the first ventilation opening or the second ventilation opening at which the external-air conditioner is installed, it is possible to suppress dust and insects contained in the conditioned external air from entering the room structure body by the ventilation opening filter sheet. Also, depending on a density and a structure of the ventilation opening filter sheet, it is also possible to prevent entry, for example, of pollen, PM 2.5, etc.

Also, the ventilation opening filter sheet, by being replaceable, is capable of being exchanged from time to time such that clogging does not occur. Yet further, it suffices to simply replace the ventilation opening filter sheet by removing it from the holding body and it is therefore possible for even a user to perform this without accompanying any special work, thus enabling operation cost to be suppressed. Here, the ventilation opening filter sheet may be a structure (a filter member) having a frame member that suppresses deformation and bending.

The holding body includes the frame body and the holding portion for the ventilation opening filter sheet and is thereby capable of detachably locking the edge portion of the ventilation opening filter sheet by the holding portion and stretching and holding the ventilation opening filter sheet along the frame body. Here, with the holding body, a net body or a rod member arranged to support the filter sheet may be positioned at an opening part at a frame body center and, in this case, it is possible to suppress bending and deformation due to wind pressure even with a thin, flexible filter sheet.

The supporting frame body is capable of supporting the holding body that has been put inside the frame. It is thereby possible to support the holding body such as to prevent deviation of the ventilation opening filter sheet from a predetermined position and passing through of air that is not filtered by the ventilation opening filter sheet. Also, by being arranged such that the holding body is capable of being put in and taken out from the side, the supporting frame body enables replacement work of the filter sheet to be performed easily.

Here, if, for example, the supporting frame body enables the holding body to be put in and taken out from below and the air filter apparatus is disposed vertically along a room interior side of the outer wall portion and in a vicinity of the ceiling, there is a risk of the holding body falling and hitting a worker, etc., below when a hand slips or a lock is loose when the holding body is being put in or taken out from the supporting frame body. However, with the air filter apparatus described above, the holding body is a structure that is capable of being put in and taken out from the side of the supporting frame body, thereby making it unlikely for dropping due to gravity and falling off to occur, reducing a possibility of occurrence of a dropping accident, and improving safety.

Thus, by being disposed at the room interior side, the air filter apparatus is made a structure that enables maintenance of the air filter to be performed from inside the room structure body and is improved in convenience.

Also, if the ventilation opening filter sheet contains an antiviral metal component of at least one type selected from among copper oxide, silver oxide, iron oxide, and manganese oxide, it is capable of modifying a molecule that constitutes a contaminant such as a bacteria, virus, etc., to perform sterilization and inactivation of virus. It is thus possible to disinfect bacteria and virus contained in air flowing in from the exterior and take cleaned air into the room interior.

Also, if the air intake opening of the room interior unit is provided with an air intake opening filter sheet and the air intake opening filter sheet contains an antiviral metal component of at least one type selected from among copper oxide, silver oxide, iron oxide, and manganese oxide, it is possible, as mentioned above, to modify a molecule that constitutes a contaminant such as a bacteria, virus, etc., to perform sterilization and inactivation of virus. It is thus possible to disinfect bacteria and virus contained in air taken in from the air intake opening of the room interior unit and send cleaned air.

Also, if a podium is installed in a vicinity of the wall portion adjacent to whichever of the first ventilation opening or the second ventilation opening at which the external-air conditioner is installed, it is possible to use the room structure body as a classroom. Here, if, with installation of the abovementioned podium, a ventilating fan or other forced air exhausting apparatus is disposed at the ventilation opening to be at the air exhaust side, the ventilation opening to be at the air exhaust side at which fan wind noise, etc., is generated is made distant from the podium, making it possible for a voice of a person (a teacher, etc.) using the podium in a class to be heard well.

Also, if a forced air supplying apparatus is disposed at an indoor side of whichever of the first ventilation opening or the second ventilation opening is at the external-air conditioner installed side, it is possible to implement a class 1 ventilation (with a forced air exhausting system at the air exhaust side as well) or a class 2 ventilation (with a natural air exhausting system at the air exhaust side) as a ventilation system of the room structure body. Further, by the forced air supplying apparatus being disposed at the indoor side, good convenience is provided because it is possible to perform cleaning and other maintenance work on the forced air supplying apparatus at an inner side of the room structure body. Also, although the "forced air supplying apparatus," may, for example, be an air supplying fan, etc., it is not restricted thereto and may be an air sending apparatus, etc., that does not perform air supplying fanning.

Also, if a forced air exhausting apparatus is disposed at an indoor side of whichever of the first ventilation opening or the second ventilation opening at which the external-air conditioner is not installed, it is possible to implement a class 1 ventilation (with a forced air supplying system implemented at the air supply side as well) or a class 2 ventilation (with a natural air supplying system implemented at the air supply side) as the ventilation system of the room structure body. Further, by the forced air exhausting apparatus being disposed at the indoor side, good convenience is provided because it is possible to perform cleaning and other maintenance work on the forced air exhausting apparatus at the inner side of the room structure body.

In order to achieve the aforementioned object, a ventilation air conditioning structure of the present invention includes an air conditioner that has a room interior unit disposed inside a room structure body that has wall portions partitioning an interior and an exterior of a room inside a building, with at least one of the wall portions being an outer wall portion in contact with the outdoors and the outer wall portion having a first ventilation opening formed in a vicinity of one of adjacent wall portions and a second ventilation opening formed in a vicinity of another of the adjacent wall portions, and being capable of sending air in a direction of a wall portion facing the outer wall portion and a refrigerant piping connecting the room interior unit and a room exterior unit and an external-air conditioner disposed at an outdoor side of the outer wall portion and having a heat exchanger provided in a refrigerant circuit of the air conditioner via a branched pipe branched from the refrigerant piping, and a casing housing the heat exchanger and having formed therein a first opening portion opening in a down direction and a second opening portion opening at a back portion to be in an outer wall portion direction, with the second opening portion being in communication with either the first ventilation opening or the second ventilation opening.

The air conditioner has the room interior unit disposed inside the room structure body and the refrigerant piping connecting the room interior unit and the room exterior unit such that heat exchange is performed by the refrigerant circulated between the room interior unit and the room exterior unit through the refrigerant piping and air inside the room structure body and is thereby enabled to supply the conditioned air that is cool air or warm air into the room structure body.

Also, the room interior unit, by being capable of sending air in the direction of the wall portion facing the outer wall portion, is enabled to make fresh external air that entered from the ventilation opening to be at the air supply side ride on a flow of the conditioned air blown out from the room interior unit and hit the wall portion facing the outer wall portion. The air in which the external air and the conditioned air that hit the wall portion are mixed then diffuses in an up direction, the down direction, and right and left directions of the wall portion facing the outer wall portion and circulates inside the room structure body. Consequently, it is possible to suppress nonuniformity of concentrations of $CO_2$, etc., at various locations inside the room structure body.

By being disposed at the outdoor side of the outer wall portion, the external-air conditioner is easy to install in either a newly built or existing building in comparison to a case of installing in a ceiling space or under a floor and is also easy to maintain because of not being of a mode where an installed conditioner body is covered and hidden by a ceiling, a floor surface, etc.

Also, the external-air conditioner is disposed at the outdoor side of the outer wall portion and thereby the heat exchanger is enabled to perform external air conditioning until the external air passes through the ventilation opening to be at the air supply side. Also, by having the heat exchanger provided in the refrigerant circuit of the air conditioner via the branched pipe branched from the refrigerant piping, the external-air conditioner has a structure that is interlocked with operation of the air conditioner. Running to perform external-air conditioning without requiring electric power and an intrinsic refrigerant for operation of a conditioner body is thereby made possible and contribution to energy saving is enabled.

By such external-air conditioning being performed, an extreme temperature difference between the conditioned external air entering the room structure body and the air inside the room structure body is eliminated and it is also possible to reduce a temperature difference with respect to a target temperature of the air conditioner. Consequently, in the air conditioner, a rise time of the air conditioner is shortened, an operation load is reduced, and by cooperation with the external-air conditioner, further contribution to energy saving is enabled.

Further, by the heat exchanger being housed in the casing, the external-air conditioner is enabled to prevent exposure of the heat exchanger in an outdoor environment and protect the heat exchanger against deformation due to an external force and attachment of dirt. That is, the heat exchanger, which is a main portion, is protected and improved in weather resistance and durability, thus enabling elongation of product life. Also, the casing partitions an interior and an exterior of a conditioner body of the external-air conditioner and thereby, a flow passage for the external air is formed and it is possible to prevent the conditioned external air that has been heated, etc., by the heat exchanger from mixing with air outside the conditioner or prevent the conditioned external air from diffusing out of the conditioner.

The first opening portion formed in the casing becomes, during actuation, an introduction opening for the external air and is capable of introducing the external air and, due to being opened in the down direction, is also capable of making it unlikely for wind, rain, etc., to enter the casing. Also, the second opening portion formed in the back portion of the casing that is in the outer wall portion direction becomes, during actuation, a delivery opening for the external air that has been heat-exchanged by the heat exchanger (the conditioned external air) and is capable of delivering the conditioned external air out of the conditioner. In this process, the second opening portion is in communication with either the first ventilation opening or the second ventilation opening and, via whichever of the first ventilation opening or the second ventilation opening is in communication, it is made possible to make the conditioned external air reach the interior of the room structure body without letting it diffuse.

In order to achieve the aforementioned object, a ventilation air conditioning method of the present invention includes a first step of using a heat exchanger that is connected to and supplied with a refrigerant from a refrigerant circuit of an air conditioner with a room interior unit disposed inside a room closed in up and down directions and at four sides between upper and lower sides to heat or cool external air introduced into a casing of an external-air conditioner installed at an outdoor side of an outer wall portion in contact with the outdoors of the room and a second step of introducing the heated or cooled external air into the room via a first ventilation opening formed in a portion of the outer wall portion in a vicinity of one of adjacent wall portions and being in communication with the casing and sending air in a direction of a wall portion facing the outer wall portion by the room interior unit to make the air inside the room and the introduced external air undergo convection and mixing and be exhausted from a second ventilation opening formed in a portion of the outer wall portion in a vicinity of another of the adjacent wall portions.

Here, in the first step, the external air enters the casing of the external-air conditioner and is heated or cooled by the heat exchanger to become conditioned external air. In this process, the heat exchanger receives the supply of the refrigerant via the refrigerant circuit of the air conditioner and performs heat exchange of the external air.

In the second step, the conditioned external air generated in the first step enters the room via the first ventilation opening. In this process, the conditioned external air reaches an interior of the room via the first ventilation opening in communication with the casing without diffusing. The conditioned external air that reached the room interior undergoes convection with the air sent in the direction of the wall portion facing the outer wall portion by the room interior unit and mixes with the air in the interior of the room.

Further, the mixed air rides on a flow of conditioned air blown out from the room interior unit, hits the wall portion facing the outer wall portion, and diffuses in the up and down directions and right and left directions of this wall portion to undergo further convection inside the room and suppress non-uniformity of concentrations of $CO_2$, etc., at various locations inside the room.

The air that circulated inside the room exits outdoors (is exhausted) via the second ventilation opening to be at an air exhaust side and the concentrations of $CO_2$, etc., inside the room decrease. Also, fresh external air immediately after entering from the first ventilation opening to be at an air supply side is unlikely to be discharged immediately from the second ventilation opening to be at the air exhaust side that is at a separated position.

Advantageous Effects of Invention

According to the present invention, a ventilation air conditioning structure and a ventilation air conditioning method can be provided with which installation and maintenance in either a newly built or existing building are easy, suppression of electric power consumption amount of an air conditioner is enabled by use of an external-air conditioner interlocked with the air conditioner being in air conditioning operation inside a room, and conditioned external air is enabled to be circulated inside the room using a flow of conditioned air sent from the air conditioner.

DESCRIPTION OF EMBODIMENTS

Figure 1:
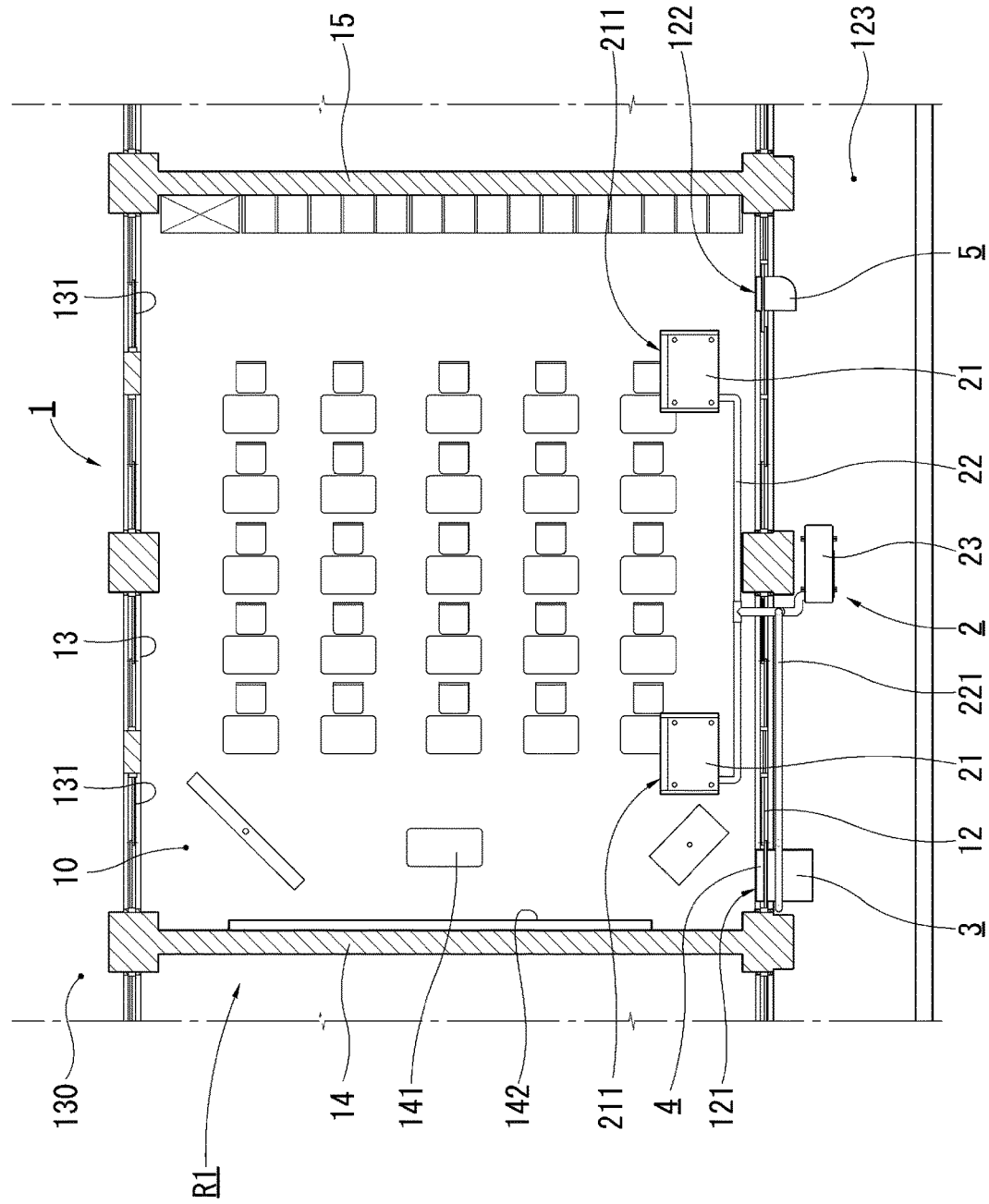
FIG. 1 is a planar descriptive view showing a ventilation air conditioning structure (first embodiment) of the present invention.
Figure 2:
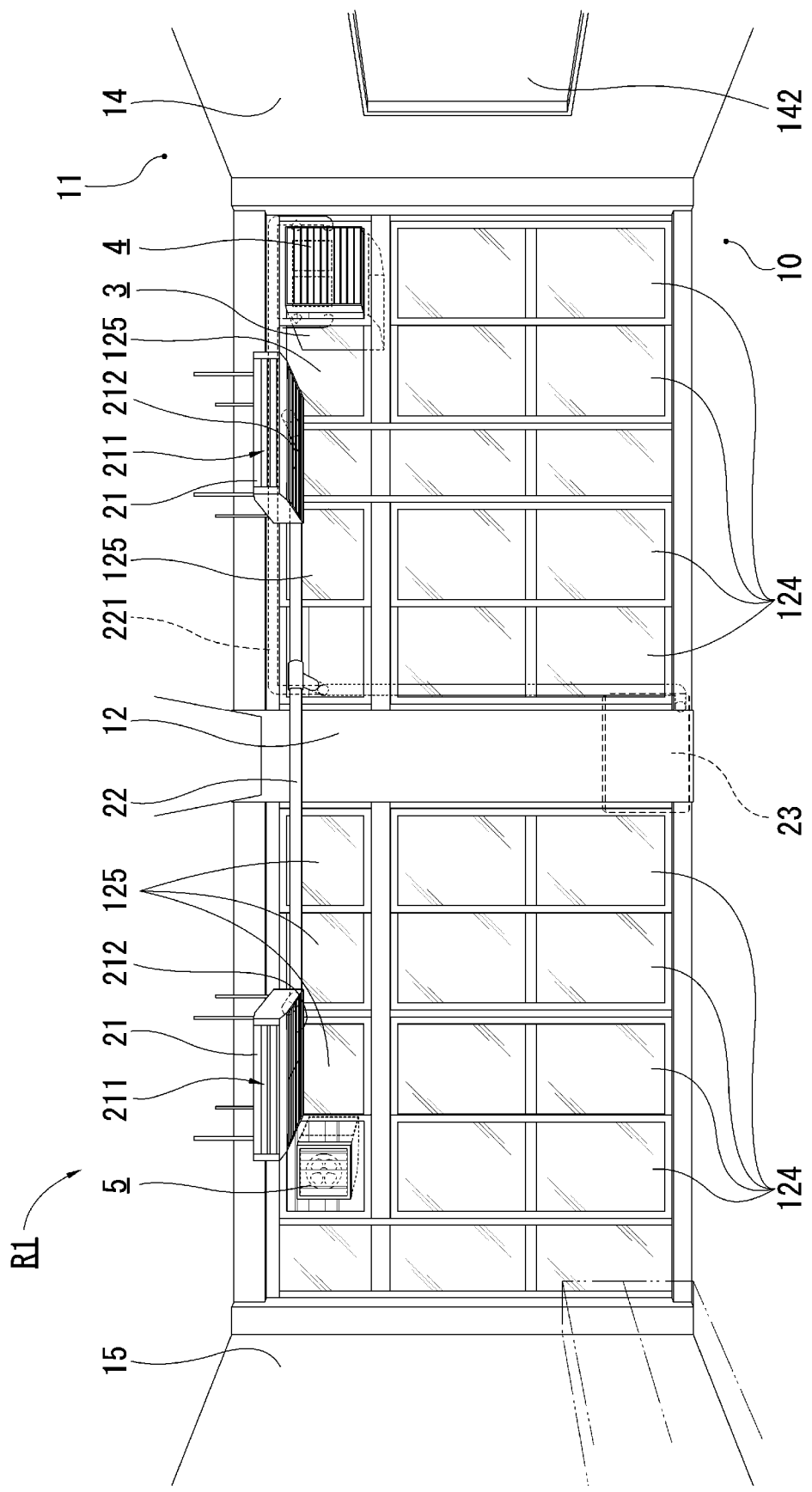
FIG. 2 is a descriptive view showing a first wall portion as viewed from a direction of a second wall portion shown in FIG. 1.

Embodiments of the present invention shall now be described in more detail with reference to FIG. 1 to FIG. 12. In the following, [First Embodiment], [Modification 1], [Second Embodiment], and [Modification 2] shall be described in that order. Also, reference signs in each drawing are provided in a limited way such as to reduce complication and facilitate understanding, and for a plurality of equivalents provided with the same reference sign, the reference sign is provided to just a portion thereof.

In the description that follows, the abovementioned "room structure body" is referred to simply as "room." Also, in regard to the abovementioned "wall portions," the abovementioned "outer wall portion" is referred to as "first wall portion," the abovementioned "wall portion facing the outer wall portion" is referred to as "second wall portion," and the other wall portions positioned between the first wall portion and the second wall portion are referred to as "third wall portion" and "fourth wall portion," respectively. Further, the abovementioned "first ventilation opening" is referred to as "air supply opening" and the abovementioned "second ventilation opening" is referred to as "air exhaust opening." Yet further, the abovementioned "first opening portion" is referred to as "introduction opening" and the abovementioned "second opening portion" is referred to as "delivery opening."

First Embodiment

FIG. 1 to FIG. 5 are referenced. A ventilation air conditioning structure R1 includes a room 1, an air conditioner 2, an external-air conditioner 3, an air filter apparatus 4, and an air exhausting apparatus 5. The respective portions shall be described in detail below.

(Room 1)

The room 1 has a floor portion 10, a ceiling portion 11, a first wall portion 12, a second wall portion 13, a third wall portion 14, and a fourth wall portion 15. In the present embodiment, the room 1 is a classroom and a podium 141 is installed in a vicinity of the third wall portion 14.

The ceiling portion 11 is positioned above the floor portion 10. Since the room 1 is a classroom in the present embodiment, an interval from the floor portion 10 to the ceiling portion 11 is set to a height (of at least 3 meters) based on Paragraph 2 of Article 21 of the Building Standards Act Enforcement Order.

Between the ceiling portion 11 and the floor portion 10, the first wall portion 12 constitutes an outer wall of a building. The room 1 is a classroom in the present embodiment and therefore, as in the structure of a general school, it is mandated that a wall be formed to face an athletic field, etc., from a standpoint of lighting, etc., and the first wall portion 12 corresponds to this wall.

The first wall portion 12 has a column (reference sign omitted) at a center and glass windows (reference signs omitted) of a height reaching from the floor portion 10 to the ceiling portion 11 are disposed at both sides across the column. The glass windows have parts of ordinary double sliding windows 124 provided at a lower side and parts of transom windows (high windows) 125 provided at an upper side across an upper horizontal member of lintel shape at a height of approximately 2 meters (see FIG. 2).

In the present embodiment, the room 1 has a structure having a veranda 123 outside the first wall portion 12 and a room exterior unit 23 to be described below is installed on the veranda 123. However, the present invention is not restricted to this mode and, for example, a mode where the room exterior unit 23 is mounted via a frame, etc., provided on an outer surface of the first wall portion 12 may also be implemented.

Also, an air supply opening 121 and an air exhaust opening 122 are provided in the first wall portion 12. In the present embodiment, the air supply opening 121 is provided at a gap made by removing the transom window closest to the third wall portion 14 (that is, in a region in a vicinity of the third wall portion), and the air exhaust opening 122 is provided at a gap made by removing the transom window closest to the fourth wall portion 15 (that is, in a region in a vicinity of the fourth wall portion). However, the present invention is not restricted to the above-described mode and any of various building structures of a mode, for example, where a hole formed in a wall surface is made the air supply opening or the air exhaust opening, etc., may be implemented.

The second wall portion 13 is positioned in a direction of facing the first wall portion 12 with the floor portion 10 and the ceiling portion 11 in between. Here, the room 1 is a classroom in the present embodiment and therefore, as in the structure of a general school, a wall facing the outer wall partitions a corridor 130 and the classroom and has an entrance/exit 131 with respect to the corridor 130 formed therein, and the second wall portion 13 corresponds to this wall.

The third wall portion 14 is a wall positioned such as to close a side end interval at one side between the first wall portion 12 and the second wall portion 13. The third wall portion 14 in the present embodiment is such that along the third wall portion 14, the podium 141 is provided as mentioned above and a blackboard or other display device 142 is provided.

The fourth wall portion 15 is positioned in a direction of facing the third wall portion 14 with the floor portion 10 and the ceiling portion 11 in between and is a wall provided such as to close a side end interval at the other side between the first wall portion 12 and the second wall portion 13.

Although in the present embodiment, the room 1 that is a classroom has the structure described above, the present invention is not restricted thereto and, for example, if the room is at an end portion of a building (a so-called corner room), the fourth window portion may also be an outer wall having a window. Further, there may also be a case where an entrance/exit with respect to a corridor is provided in the fourth wall portion.

(Air Conditioner 2)

The air conditioner 2 is a so-called packaged air conditioner having a room interior unit 21 and the room exterior unit 23 is connected to the room interior unit 21 via a refrigerant piping 22. The room interior unit 21 is disposed in a vicinity of the first wall portion 12 inside the room 1, is positioned such that an air intake opening 212 opposes the floor portion 10, and is positioned with an air sending opening 211 directed in a direction of the second wall portion 13. The refrigerant piping 22 is branched between the room interior unit 21 and the room exterior unit 23 and is made capable of supplying a refrigerant that flows through heat exchangers 31 of the external-air conditioner 3. Although in the present embodiment, the room interior unit 21 is a ceiling suspension type packaged air conditioner, it is not restricted thereto and may, for example, be of a ceiling cassette type, a wall mounted type, a floor type, etc., and may also be a so-called room air conditioner.

(External-Air Conditioner 3)

Figure 3A:
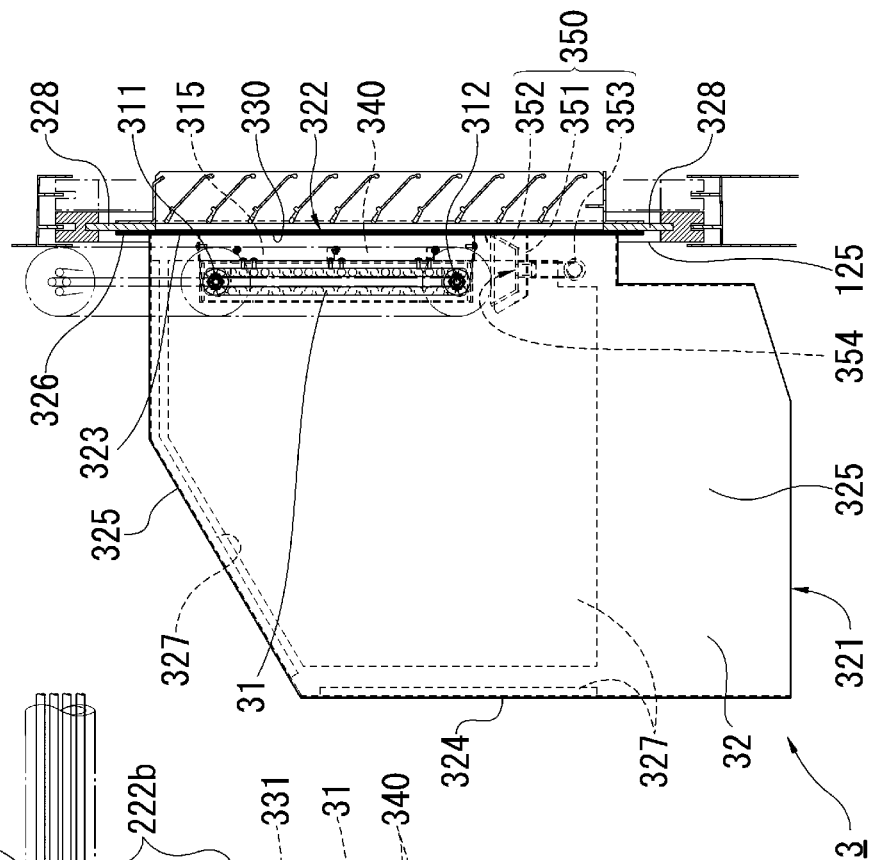
FIGS. 3A-B represent, in regard to an external-air conditioner shown in FIG. 1, an outer shape and piping by solid lines and an internal structure by broken lines, with FIG. 3A being a front schematic view of a conditioner body and FIG. 3B being a right side schematic view of the conditioner body.
Figure 3B:
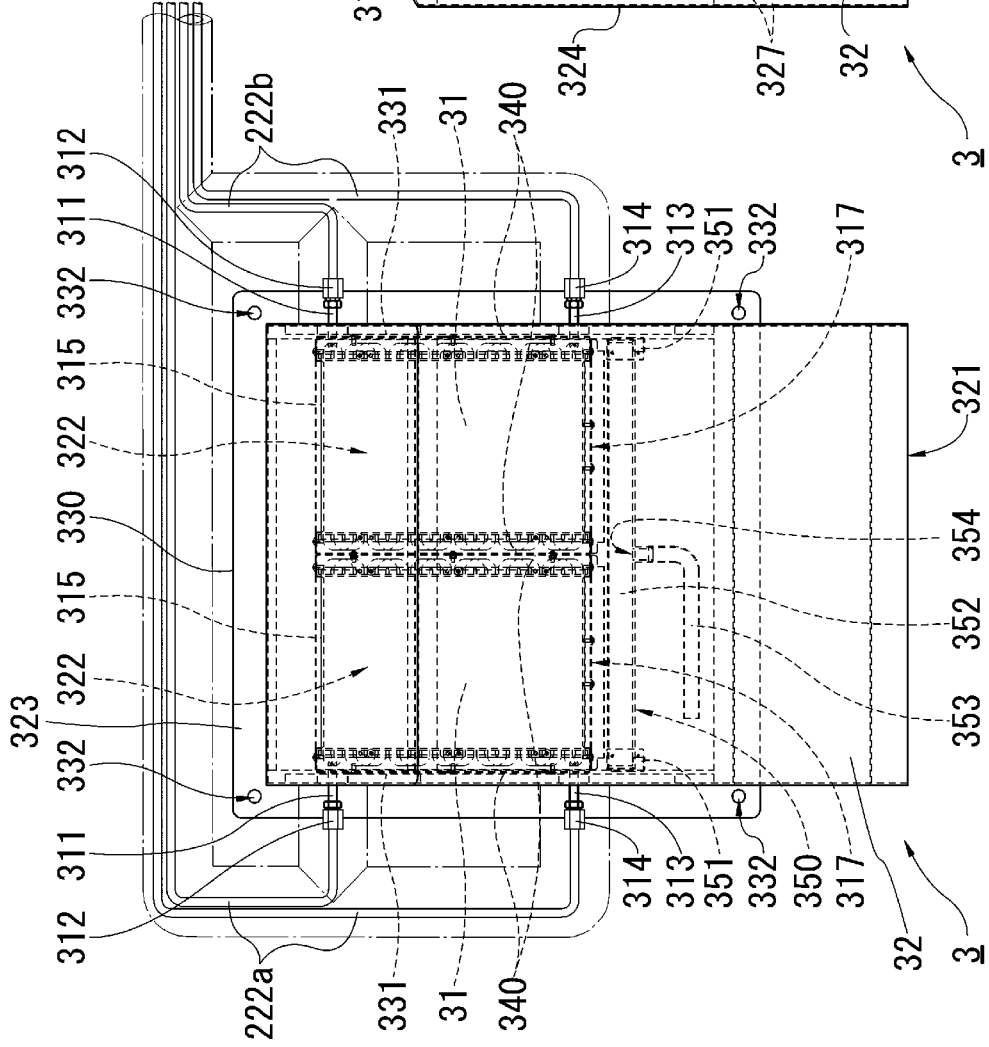
Figure 4:
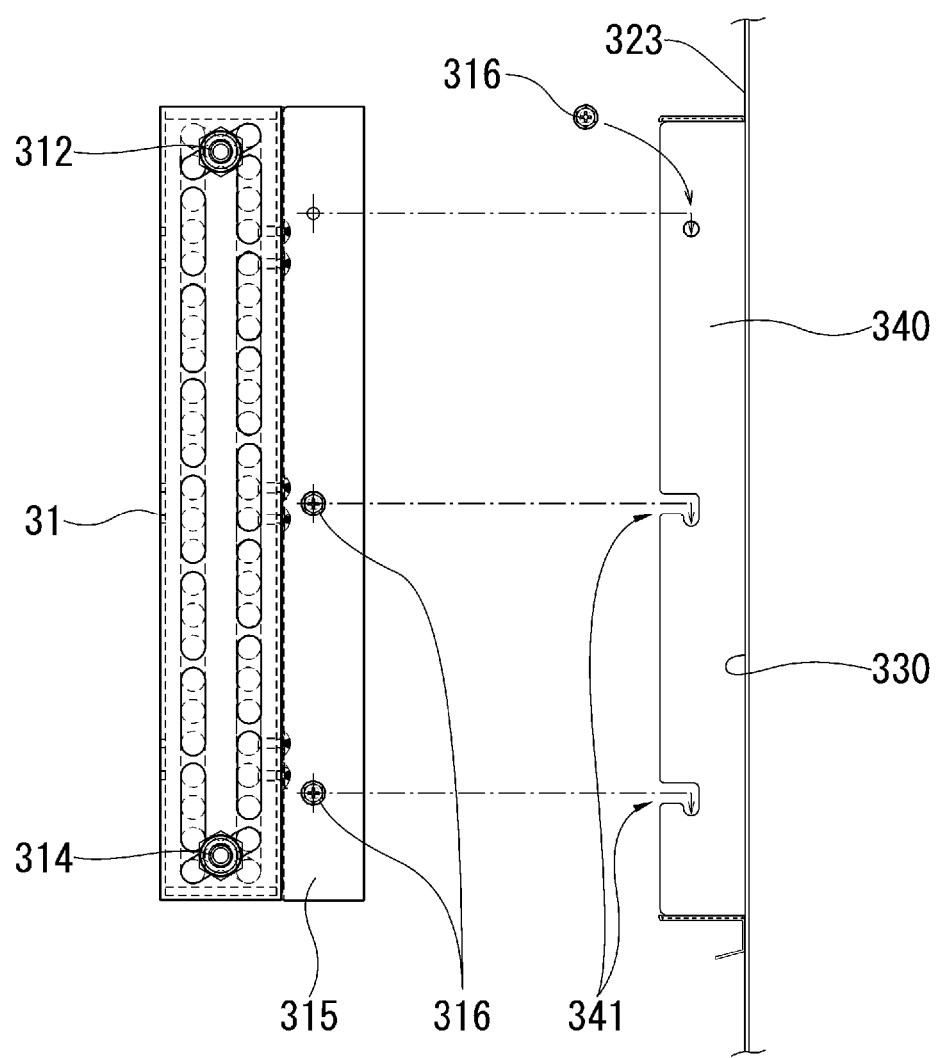
FIG. 4 is an exploded schematic view of a holding structure of a heat exchanger of the external-air conditioner shown in FIG. 3A-B as viewed from a side.

The external-air conditioner 3 is disposed at a room 1 exterior side of the first wall portion 12 and has the heat exchangers 31 and a casing 32 that houses the heat exchangers 31. As shown in FIGS. 3A-B to FIG. 4, the external-air conditioner 3 is installed on an outer surface of the first wall portion 12 such as to match delivery openings 322 with the air supply opening 121 of the first wall portion 12. Respective portions of the external-air conditioner 3 shall now be described in detail with reference to FIG. 1 to FIG. 4 (particularly FIGS. 3A-B).

<Heat Exchangers 31>

The heat exchangers 31 are incorporated in a refrigerant circuit of the air conditioner 2 via a branched pipe 221 branched from the refrigerant piping 22 (see FIG. 2) and are capable of heat exchange with external air introduced inside the casing 32.

In the present embodiment, two heat exchangers 31 are provided side by side in a right-left direction in a configuration of not overlapping with each other in an air passage direction (see FIG. 3A). Refrigerant flow passages of the respective heat exchangers 31 are separate systems and the refrigerant is supplied according to each system by rebranched pipes 222a and 222b further branched from the branched pipe 221.

Each heat exchanger 31 is of a so-called fin tube type constituted of a heat transfer pipe (not shown) of a meander shape in which rectilinear parts and foldback parts are arranged in alternating succession and a plurality of fins (not shown) intersecting the heat transfer pipe in a radius direction. Each heat exchanger 31 is provided such that an axial direction of each rectilinear part stage of the heat transfer pipe and a vertical direction of the installed external-air conditioner 3 are orthogonal and a lubricant component contained in the refrigerant is thereby suppressed from being retained in the foldback parts.

Each heat exchanger 31 has a first inlet/outlet pipe 311 and second inlet/outlet pipe 313 connected to the heat transfer pipe and a first joint portion 312 and a second joint portion 314 are provided at a tip of the first inlet/outlet pipe 311 and a tip of the second inlet/outlet pipe 313, respectively. The first joint portion 312 and the second joint portion 314 are capable of connection and connection release with respect to the refrigerant piping (rebranched pipes 222a and 222b) leading to the air conditioner 2.

As mentioned above, two heat exchangers 31 are positioned in the right-left direction and therefore, the first inlet/outlet pipe 311 and the first joint portion 312 of one heat exchanger 31 are positioned at a side surface at one side (right side in FIG. 3A) of the casing 32 such as to facilitate handling of the connected rebranched pipe 222a. Similarly, the second inlet/outlet pipe 313 and the second joint portion 314 of the other heat exchanger 31 are positioned at a side surface at the other side (left side in FIG. 3A) of the casing 32 such as to facilitate handling of the connected rebranched pipe 222b.

Each heat exchanger 31 is provided to be of a size that covers each of the delivery openings 322 to be described later. Also, each heat exchanger 31 is held by a heat exchanger holding structure portion 340 and a partitioning portion 315 to be described later in a mode of being spaced at a predetermined interval from the delivery opening 322 and covering the delivery opening 322 as viewed from a front of a conditioner body.

The partitioning portion 315 is provided between the heat exchanger 31 and a base portion 330 to be described later. The partitioning portion 315 is a four-side frame of rectangular shape, is formed in a mode where an opening part of a channel material of C shape in sectional view is directed in a direction of an interior of the frame, and is arranged to be a substantially airtight structure. Also, with the partitioning portion 315, an inner shape (rim part) of the opening part at the inner side of the frame is set to be substantially the same as an outer shape of the heat exchanger 31 and the heat exchanger 31 is detachably mounted such as to close the opening part. Also, the partitioning portion 315 is mounted such that the delivery opening 322 is positioned in a region within the frame and partitions an exterior and an interior of the frame and forms a space of predetermined area between the base plate portion 330 and the mounted heat exchanger 31 (see FIGS. 3A-B).

The partitioning portion 315 has a water drain hole 317 formed in a part that is in a direction of a later-described water receiver portion 350 when the partitioning portion 315 is in a mounted state (see FIG. 3A) and is thus arranged such that dew condensation water that dropped from the heat exchanger 31 into the partitioning portion 315 can be discharged to the water receiver portion 350. Also, the partitioning portion 315 has threaded holes (not shown) formed at sides of surfaces that become right and left surfaces in the mounted state and locking screws 316 are screwed into the threaded holes.

The threaded holes and the locking screws 316 are provided at positions and in numbers corresponding to later-described locking notches 341 of the heat exchanger holding structure portion 340, and the partitioning portion 315 (and the heat exchangers 31 mounted thereto) can be detachably mounted to the heat exchanger holding structure portion 340 by locking the locking screws 316 in the locking notches 341 (see FIG. 4).

Although in the present embodiment, the partitioning portion 315 and the heat exchanger holding structure portion 340 are separate members, the present invention is not restricted thereto and, for example, a structure in which a partitioning portion and a heat exchanger holding structure portion are integrated may be implemented. In this case, a heat exchanger holding portion may have a structure that is formed in a bulkhead shape along an inner side rim of a peripheral wall of a delivery opening and holds a heat exchanger such that the delivery opening and the heat exchanger overlap. And, with this heat exchanger holding portion, a region leading from the heat exchanger to the delivery opening is partitioned by the bulkhead part, making it possible to prevent conditioned external air from diffusing in directions besides that of the delivery opening, and by holding such that the delivery opening and the heat exchanger overlap, a mode is arranged where the conditioned external air that passed through the heat exchanger reaches the delivery opening in the shortest distance.

<Casing 32>

The casing 32 is mainly formed of a metal material, is constituted of a base body 323 and a peripheral wall body 320 to be at a back side of the conditioner body and a front surface side of the conditioner body, respectively, when the casing 32 is installed along an outer surface of the first wall portion 12, and has a structure with which the peripheral wall body 320 is attachable and detachable to and from the base body 323. The attachable/detachable structure is such that threaded or other insertion holes (not shown) formed in the base body 323 and threaded or other insertion holes 332 (to be described later) formed in a flange portion 326 of the peripheral wall body 320 are respectively put in communication with each other and then bolts (not shown) are fitted in to perform fastening. Also, another known attachable/detachable structure (for example, a locking structure using recesses and projections) may be adopted. Respective portions of the casing 32 shall now be described in detail.

<Base Body 323>

The base body 323 has the base plate portion 330, the heat exchanger holding structure portions 340, and the water receiver portion 350 (see FIGS. 3A-B and 4).

The base plate portion 330 has a shape oriented along the outer surface of the first wall portion 12 and has a rectangular plate shape slightly smaller than an outer shape of a mounting frame body 328 to be described later. The base plate portion 330 has, substantially at its center, two opening portions of rectangular shape formed side by side in the right-left direction across a partition and the respective opening portions become the delivery openings 322. A size of an outer shape bringing together the respective delivery openings 322 is substantially the same as that of an outer shape of the air supply opening 121 of the first wall portion 12. Also, the base plate portion 330 has formed therein a plurality of threaded or other insertion holes 332 penetrating through in a plate thickness direction and each enabling insertion of a bolt, screw, nail, pin, anchor bolt or other fixing member (hereinafter referred to as "screw, etc.") used for installation onto the first wall portion 12.

The heat exchanger holding structure portion 340 is provided for each delivery opening 322 and is a structure that holds the heat exchanger 31 in a mode where a long direction of the fins of the heat exchanger 31 and a direction directed from an introduction opening 321 to the delivery opening 322 are substantially matched. In other words, the heat exchanger holding structure portion 340 is arranged to hold the heat exchanger 31 in a mode where, in an installed state of the conditioner body, the long direction of the fins of the heat exchanger 31 and a vertical direction of the conditioner body are substantially matched.

Each of the heat exchanger holding structure portions 340 is a pair of plate bodies provided along outer edges at both right and left sides of the delivery opening 322 and each has a shape rising in a direction of the peripheral wall body 320 from the base plate portion 330 (front direction in FIG. 3A) (see FIG. 4).

Also, the heat exchanger holding structure portion 340 has the locking notches 341 provided at predetermined intervals in a long direction. Each locking notch 341 has a hook shape descending from a tip of the plate body (in other words, a front side of the conditioner body) toward a side to be a lower side of the conditioner body (see FIG. 4).

The heat exchanger holding structure portion 340 can lock the partitioning portion 315 (and the heat exchanger 31 mounted thereto) by neck parts of the locking screws 316 of the partition portion 315 described above being latched onto the locking notches 341. With this locked mode, the heat exchanger holding structure portion 340 can form predetermined intervals between the heat exchanger 31 and respective inner surfaces of a front wall portion 324, the base plate portion 330, and the flange portion 326 by holding the partitioning portion 315 including the heat exchanger 31.

The water receiver portion 350 is disposed at a location to be between the heat exchangers 31 and the introduction opening 321 and has a structure having water receiver supporting portions 351, a drain pan 352, and a drain water passage 353.

The water receiver supporting portions 351 rise from the base plate portion 330 toward the conditioner body front side and are provided to face each other in the right-left direction of the conditioner body across a distance slightly longer than a length in a long direction of the drain pan 352. Each water receiver supporting portion 351 has a shape of a receiver with bottom that is opened in the direction of facing each other and in an up direction (a shape having a bottom surface and side surfaces at three sides) and is arranged to be of a shape that enables attachably/detachably supporting the drain pan 352 and with which the drain pan 352 is unlikely to become removed in the attached state.

The drain pan 352 has a shape of a box with bottom having a bottom surface and four side surfaces rising from the bottom surface and having an opening portion with which an upper side (in other words, the side facing the heat exchangers 31) is opened in the attached state. With the drain pan 352, the opening portion is provided to be slightly wider than lower end surfaces of the heat exchangers 31 and the side surface of the drain pan 352 have shapes that narrow gradually in width toward a bottom direction. Furthermore, in the present embodiment, a lateral direction length of the drain pan 352 is formed to be longer than a length that is a sum of lateral direction widths of the respective heat exchangers 31 such as to receive, without leakage, the dew condensation water dropping from the respective heat exchangers 31. Also, a sheet shaped heat insulating material (not shown) is adhered onto an outer surface of the drain pan 352.

The drain water passage 353 is a tubular body with one end side in communication with a water drain hole 354 formed in a center of an inner bottom surface of the drain pan 352 and the other end side being led out to a conditioner exterior and is capable of draining the dew condensation water and other internally gathered water that dropped into the drain pan 352. The drain water passage 353 is not restricted in a mode of its tip portion and may, for example, be of a mode connected to a drain piping of an air conditioner or connected to a rainwater or miscellaneous wastewater system or simply being opened outdoors.

<Peripheral Wall Body 320>

The peripheral wall body 320 has a substantially rectangular box shape and has the front wall portion 324 provided at a position facing the base plate portion 330 in a state where the peripheral wall body 320 is attached to the base body 323, a side wall portion 325 with a structure where side surfaces of three sides (upper side and right and left directions) that extend in a direction of a back portion from an outer edge part of the front wall portion 324 are made integral, the flange portion 326 of predetermined width that bends substantially perpendicularly from the side wall portion 325 and extends outward, and a heat insulation structure portion 327 provided on inner surfaces of the front wall portion 324 and the side wall portion 325.

With the peripheral wall body 320, a part at which the side wall portion 325 is not formed (that is, an opened lower part) becomes the introduction opening 321. The introduction opening 321 has a filter member (not shown) having a net shape or lattice shape covering the opening part and preventing entry of birds, small animals, etc., mounted thereto. Also, the base body 323 in which the delivery openings 322, etc., are formed is mounted to a part of the peripheral wall body 320 that faces the front wall portion 324 (that is, an opened back portion).

At a location to be an upper surface, the side wall portion 325 has a bent part in a region extending toward the front wall portion 324 from the base plate portion 330 and is constituted of two surfaces inclined downwardly in a direction of the front wall portion 324. Thereby, dust is unlikely to accumulate on the upper surface of the side wall portion 325 and a load applied to the front wall portion 324 due to a strong wind from the front direction of the conditioner body is readily shifted aside.

Outer surfaces of the front wall portion 324 and the side wall portion 325 are formed of or to a water-repellable material or shape or are subject to processing of being coated with a water repellent coating. The heat insulation structure portion 327 has a structure where a sheet shaped heat insulating member having an adhesive surface and a heat reflecting surface with a heat insulating layer in between is adhered onto inner surfaces of the front wall portion 324 and the side wall portion 325.

Here, a heat insulation structure portion is not restricted to the above-described mode and, for example, a front wall portion and a side wall portion may be formed of or to a material or shape having a heat insulating property and a heat reflecting property or may be those that are subject to processing having a heat insulating property and a heat reflecting property. Also, the heat insulation structure portion may have a structure constituted of an outer surface plate to be an outer surface of the conditioner body, an inner surface plate to be an inner surface of the conditioner body, and a heat insulating member disposed between the inner surface plate and the outer surface plate (or puts an interval between the plates in an extremely low pressure state without using a heat insulating member).

<Mounting Frame Body 328>

The mounting frame body 328 has a rectangular plate shape and has an opening portion 329 formed in a center. The mounting frame body 328 is used by fitting in to a window frame of the abovementioned transom window 125 and the external-air conditioner 3 is mounted by matching positions of the opening portion 329 and the delivery openings 322 (see FIG. 10).

(Air Filter Apparatus 4)

The air filter apparatus 4 covers the air supply opening 121 while allowing air passage and is provided along the first wall portion 12 at an inner side of the room 1. In the present embodiment, the air filter apparatus 4 is a louver that has a filter sheet.

(Air Exhausting Apparatus 5)

The air exhausting apparatus 5 is disposed at the air exhaust opening 122 and is a so-called ventilating fan in the present embodiment. For ventilation in the ventilation air conditioning structure R1, a class 3 ventilation (using mechanical ventilation for air exhausting and natural ventilation for air supplying) system is arranged by the external-air conditioner 3 that is a natural air supplying means and the air exhausting apparatus 5 that is a forced air exhausting means.

(Actions)

Actions and effects of the ventilation air conditioning structure R1 shall be described with reference to FIG. 1 to FIG. 5.

By the air supply opening 121 and the air exhaust opening 122 being formed in the first wall portion, the room 1 is enabled to supply and exhaust air from and to the outdoors. In this process, fresh external air immediately after entering from the air supply opening 121 is made unlikely to be discharged immediately from the air exhaust opening 122 because the air supply opening 121 and the air exhaust opening 122 are in a configuration of being apart from each other at the first wall portion 12.

By start of its operation, the air conditioner 2 supplies conditioned air into the room 1 upon heat exchange by the air inside the room 1 and the refrigerant circulated inside the refrigerant piping 22 being performed.

Figure 5:
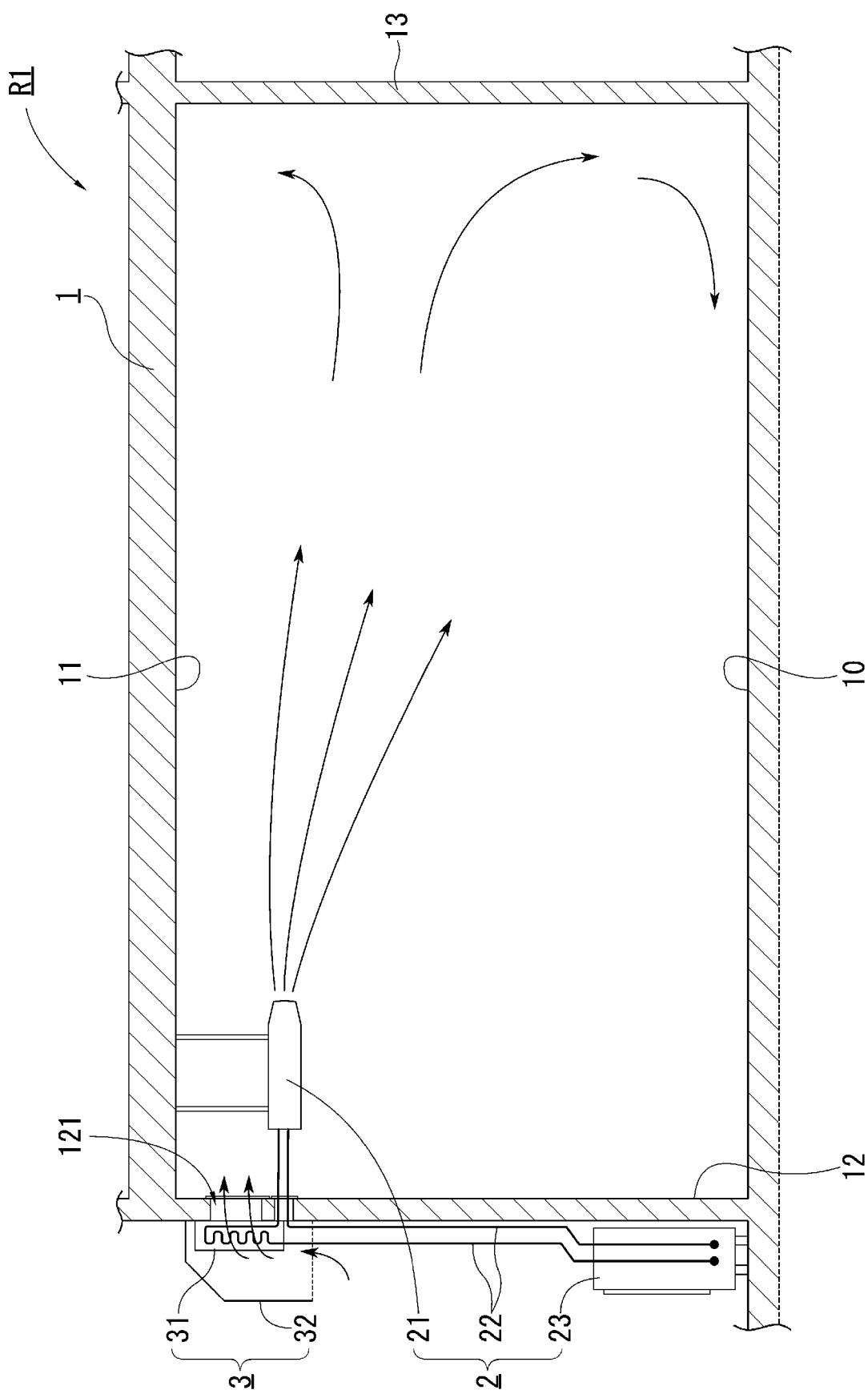
FIG. 5 is a partial sectional view showing activity of the ventilation air conditioning structure shown in FIG. 1.

In this process, due to the air sending opening 211 of the room interior unit 21 of the air conditioner 2 being directed in the direction of the second wall portion 13, the fresh external air that entered from the air supply opening 121 rides on a flow of the conditioned air blown out from the room interior unit 21 and first hits the second wall portion 13 and the air in which the external air and the conditioned air that hit the second wall portion 13 are mixed then diffuses in the up and down directions and the right and left directions of the second wall portion 13 and circulates inside the room 1, enabling the external air and the air inside the room 1 to be mixed (see FIG. 5). Consequently, it is possible to suppress nonuniformity of concentrations of $CO_2$, etc., at various locations inside the room.

Also, the room interior unit 21 is positioned near the air supply opening 121 and at the ceiling portion and the fresh external air that entered from the air supply opening 121 rides readily on the flow of the conditioned air that becomes a horizontal laminar flow during cooling operation and becomes an upward flow during heating operation. Further, it is possible to take the external air conditioned by the external-air conditioner 3 into the room interior unit 21 before much of its heat is lost.

By being disposed at the outdoor side of the first wall portion 12, the external-air conditioner 3 is easy to install in either a newly built or existing building in comparison to an arrangement that is installed in a ceiling space or under a floor and is also easy to maintain because of not being of a mode where an installed conditioner body is covered and hidden by a ceiling, a floor surface, etc.

The external-air conditioner 3 is capable of performing external-air conditioning by the heat exchangers 31 until the external air passes through the air supply opening 121. Also, with the present embodiment, the external-air conditioner 3 has two heat exchangers 31 that are disposed in parallel and is thus enabled to perform external-air conditioning and supplying of conditioned external air of sufficient amounts even for a spacious space such as a classroom.

By the external-air conditioning being performed by the external-air conditioner 3, an extreme temperature difference between the entering conditioned external air and the air inside the room is eliminated and it is also possible to reduce a temperature difference with respect to a target temperature of the air conditioner 2. Consequently, in the air conditioner 2, a rise time until a preset target temperature is reached is shortened, making it possible to reduce an operation load of the air conditioner 2. In addition, by incorporation in the refrigerant circuit of the air conditioner 2, the external-air conditioner 3 has a structure that is interlocked with the operation of the air conditioner 2 (a structure where the external-air conditioner 3 itself does not use electric power) and therefore does not require electric power and an intrinsic refrigerant for operation of the conditioner body. That is, by cooperation of the abovementioned air conditioner and the external-air conditioner, contribution to energy saving is enabled.

By having the casing 32, the external-air conditioner 3 is capable of preventing exposure of the heat exchangers 31 in an outdoor environment and protecting the heat exchangers 31 against deformation due to an external force and attachment of dirt. That is, weather resistance and durability are improved and elongation of product life is thus enabled. Also, by the heat exchangers 31 being of the fin tube type, heat exchange efficiency is good and the external air that passes through can be heated or cooled with high efficiency. Also, the heat exchangers 31 of the fin tube type are compact and lightweight, thus making it possible to make the entire conditioner body of the external-air conditioner 3 compact and lightweight. It is consequently possible to decreases a load applied to the first wall portion 12 on which the conditioner body is installed.

The peripheral wall body 320 partitions an interior and an exterior of the conditioner body to form a flow passage for the external air and is capable of preventing the conditioned external air that has been heated, etc., by the heat exchangers 31 from mixing with air outside the conditioner or preventing the conditioned external air from diffusing out of the conditioner. Also, the heat insulation structure portion 327 is capable of suppressing or reducing influence of heat due to an environment outside the conditioner on the external air and the conditioned external air that entered inside casing 32. For example, even if an outer surface of the peripheral wall body 320 of the external-air conditioner 3 becomes high in temperature due to exposure to direct sunlight during summer or becomes low in temperature due to exposure to wind, snow, etc., during winter, direct transfer of such heat to the conditioner interior (for example, an inner surface of the peripheral wall body 320) is suppressed or reduced.

The introduction opening 321 is capable of introducing the external air and is also capable of making it unlikely for wind, rain, etc., to enter the casing 32. Also, the delivery openings 322 are capable of making the conditioned external air reach the air supply opening without diffusing and delivering it into the room. Yet further, the heat exchanger holding portions 340 are arranged such as to prevent the conditioned external air that passed through the heat exchangers 31 from diffusing in directions besides that of the delivery openings 322 and make it reach the delivery openings in the shortest distance.

The air filter apparatus 4 is capable of preventing dust and insects contained in the conditioned external air from entering the room. The air exhausting apparatus 5 is capable of decreasing the concentrations of $CO_2$, etc., in the room by discharging the air inside the room 1.

Incidentally, due to weather circumstances in recent years, occasions of using an air conditioner at times other than a conventional midsummer or midwinter period has increased and obviously, when the air conditioner is used, windows are shut. Further, the windows may also be shut in periods in which PM 2.5, yellow sand, or pollen flies even if circumstances are such that an external temperature is a moderate temperature and the air conditioner is not used.

Due to many of newly built or remodeled rooms being highly airtight structures in recent years, when, due to use of an air conditioner, a state in which ventilation is not performed continues for a long period, $CO_2$ concentration increases. In particular, if a room is a classroom, many children or students stay in the room for a long time and therefore increase in $CO_2$ concentration is especially significant (see the graph of FIG. 6 to be described below). If the $CO_2$ concentration is high, even if it is of a light level, it brings about sleepiness and decrease in ability to concentrate, and therefore a classroom, which is a place of learning, desirably has an appropriate $CO_2$ concentration at all times.

On the other hand, by the ventilation air conditioning structure R1, a comfortable space can be provided as a room and especially as a classroom as described above. Also, during construction, installation in either a newly built or existing building is easy, and in operational use, it is also possible to suppress an electric power consumption amount and it is thus also possible to lighten an economic burden of a facility manager. Further, the ventilation air conditioning structure R1 contributes to energy saving by suppression of electric power consumption amount during operational use and is thus arranged to contribute to social contribution as an environmental load reducing technology.

Also, by the ventilation air conditioning structure R1, an air conditioner installed in each room can be made a heat source, and this means that a heat source can be secured according to each room as a unit and means that ventilation air conditioning is enabled according to each room as a unit. The arrangement is thus such that enables finely-tuned operational use, such as not performing ventilation air conditioning in an unused room, etc., and contributes to energy saving and also contributes to reduction of running cost.

[Ventilation Air Conditioning Method]

A ventilation air conditioning method shall now be described. The ventilation air conditioning method has a first step and a second step.

In the first step, the above-described heat exchangers 31 are used to heat or cool the external air introduced into the casing 32 of the external-air conditioner 3.

In the second step, the conditioned external air that has been external-air conditioned by the above-described external-air conditioner 3 is introduced into the room 1 via the air supply opening 121 in communication with the delivery openings 322 and air sending in the direction of the second wall portion 13 is performed by the room interior unit 21 to make the air in the room 1 and the introduced conditioned external air undergo convection and mixing and be exhausted from the air exhaust opening 122.

In the first step, the external air enters from the introduction opening 321 of the external-air conditioner 3. It is then heated or cooled by the heat exchangers 31 inside the casing 32 and becomes conditioned external air. In this process, the heat exchangers 31 of the external-air conditioner 3 receive the supply of the refrigerant via the refrigerant circuit of the air conditioner 2 to perform heat exchange of the external air.

In the second step, the conditioned external air enters the room via the delivery openings 322 of the external-air conditioner 3. In this process, the conditioned external air reaches the interior of the room 1 via the delivery openings 322 in communication with the air supply opening 121 without diffusing. The conditioned external air that reached the room interior then undergoes convection along with the air sending in the direction of the second wall portion 13 performed by the room interior unit 21 and becomes mixed with the air inside the room 1.

Further, this mixed air rides on the flow of the conditioned air blown out from the room interior unit 21, hits the second wall portion 13, diffuses in the up, down, right, and left directions of the second wall portion 13, and undergoes convection inside the room 1 (circulates in the room interior) to suppress the nonuniformity of concentrations of $CO_2$, etc., at various locations inside the room 1. Then, the air that circulated inside the room 1 exits outdoors (is exhausted) via the air exhaust opening 122 and the concentrations of $CO_2$, etc., inside the room 1 decreases. The fresh external air immediately after entering from the air supply opening 121 is unlikely to be discharged immediately from the air exhaust opening 122 at the separated position.

[Tests]

A comparison test of performing heating operation in a classroom A and a classroom B was performed to see how the capability of the ventilation air conditioning structure R1 is exhibited. The classroom A and the classroom B are adjacent classrooms in the same school and are of substantially the same structure in area and shape. Also, in the classroom A and the classroom B, the same number of the air conditioners 2 of the same model (one air conditioner 1 with two room interior units and one room exterior unit) are disposed in the same layout.

(Test 1 (1). Comparison Test of Change of Carbon Dioxide Concentration Before Construction of the Present Invention)

Figure 6:
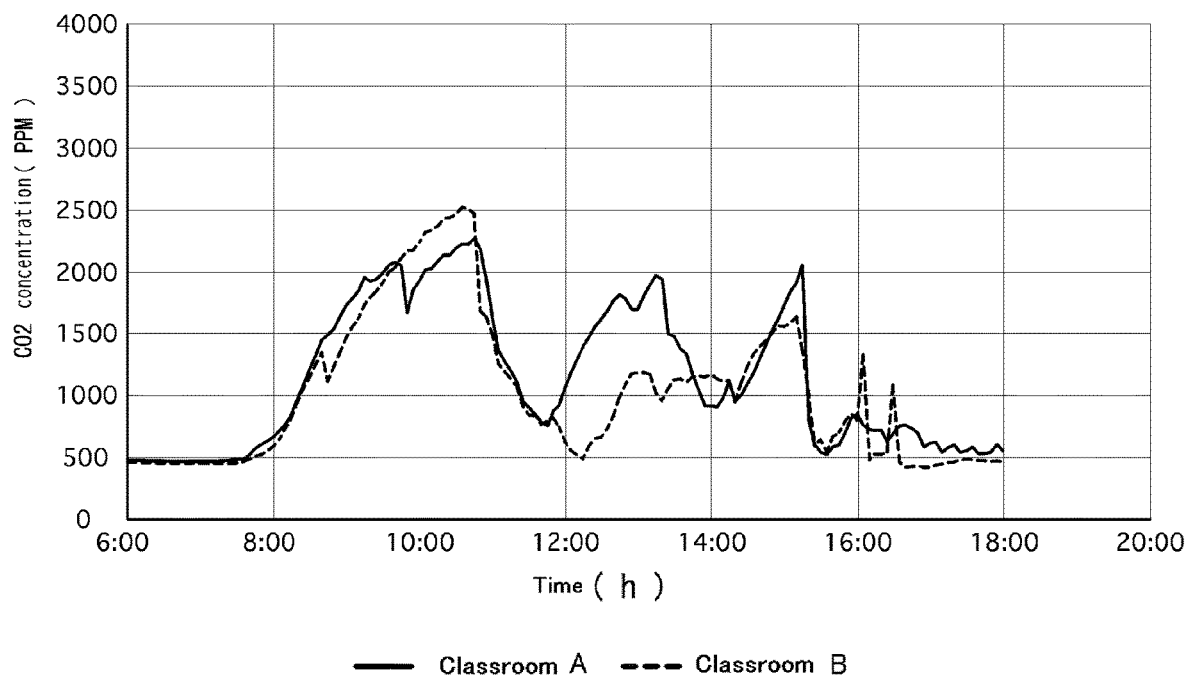
FIG. 6 is a graph showing results of a comparative test of change in concentration of carbon dioxide in general rooms (before installation of the ventilation air conditioning structure)

FIG. 6 is referenced. FIG. 6 shows results of a prior assessment carried out on Jan. 9, 2019 before installation of ventilation structures in the classroom A and the classroom B. On that day, in both the classroom A and the classroom B, ordinary classes were held and each classroom was used by 25 students and teachers. Also, in both the classroom A and the classroom B, windows, etc., were completely shut and the air conditioners were put in operation during class as a rule. Also, in both the classroom A and the classroom B, a $CO_2$ monitor was positioned at a center of the fourth wall portion and measurements were made every 5 minutes.

Consequently, as the carbon dioxide concentrations, a maximum of approximately 2300 PPM was recorded in the classroom A and a maximum of approximately 2500 PPM was recorded in the classroom B. Here, sudden decreases in the carbon dioxide concentrations during the day are those accompanying ventilation during recess or by instruction of a teacher, and sudden decreases in the carbon dioxide concentrations in the afternoon are those accompanying leaving of the students from school.

(Test 1 (2). Comparison Test of Change of Carbon Dioxide Concentration after Construction of the Present Invention)

The classroom A is arranged with the ventilation air conditioning structure R1 described above. On the other hand, the classroom B, although equipped with the same air exhausting apparatus (ventilating fan) as the classroom A at an air exhaust opening, has a simple ventilation structure with just a louver disposed at an air supply opening and not equipped with the external-air conditioner 3.

Figure 7:
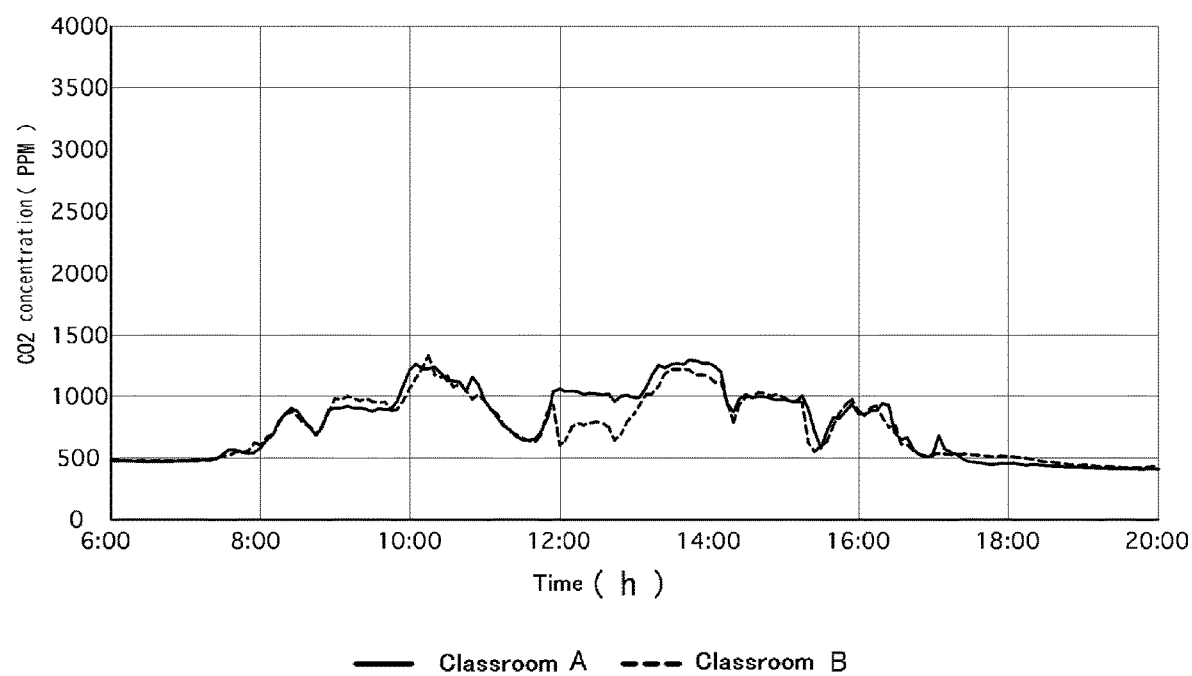
FIG. 7 is a graph showing results of a comparative test of change in concentration of carbon dioxide in a room installed with the ventilation air conditioning structure and a room not installed with the ventilation air conditioning structure.

FIG. 7 is referenced. FIG. 7 shows results of measurements made on Jan. 31, 2019 after execution of work of arranging the ventilation air conditioning structure R1 in the classroom A and the ventilation structure in the classroom B. On that day, in both the classroom A and the classroom B, ordinary classes were held and each classroom was used by 25 students and teachers. Also, in both the classroom A and the classroom B, windows, etc., were completely shut, the air conditioners were put in operation, and the air exhausting apparatuses were used at a "strong" setting during class. Consequently, the carbon dioxide concentrations stayed at being recorded at a maximum of approximately 1300 PPM in both the classroom A and the classroom B.

(Discussion of Results of Tests 1 (1) and (2))

A comparison of FIG. 6 and FIG. 7 shows that the maximum values of the carbon dioxide concentrations decreased after the ventilation air conditioning structure or the ventilation apparatus was installed. In regard to this, it is surmised that, by the "strong" operation of the air exhausting apparatus, the interior of each room became negative in pressure and the maximum value of the carbon dioxide concentration decreased greatly due to the fresh external air introduced from the air supply opening. That is, it became clear that installing and operating the air exhausting apparatus is effective for reducing the carbon dioxide concentration inside the room.

(Test 2. Comparison Test of Temperature Change)

Figure 8:
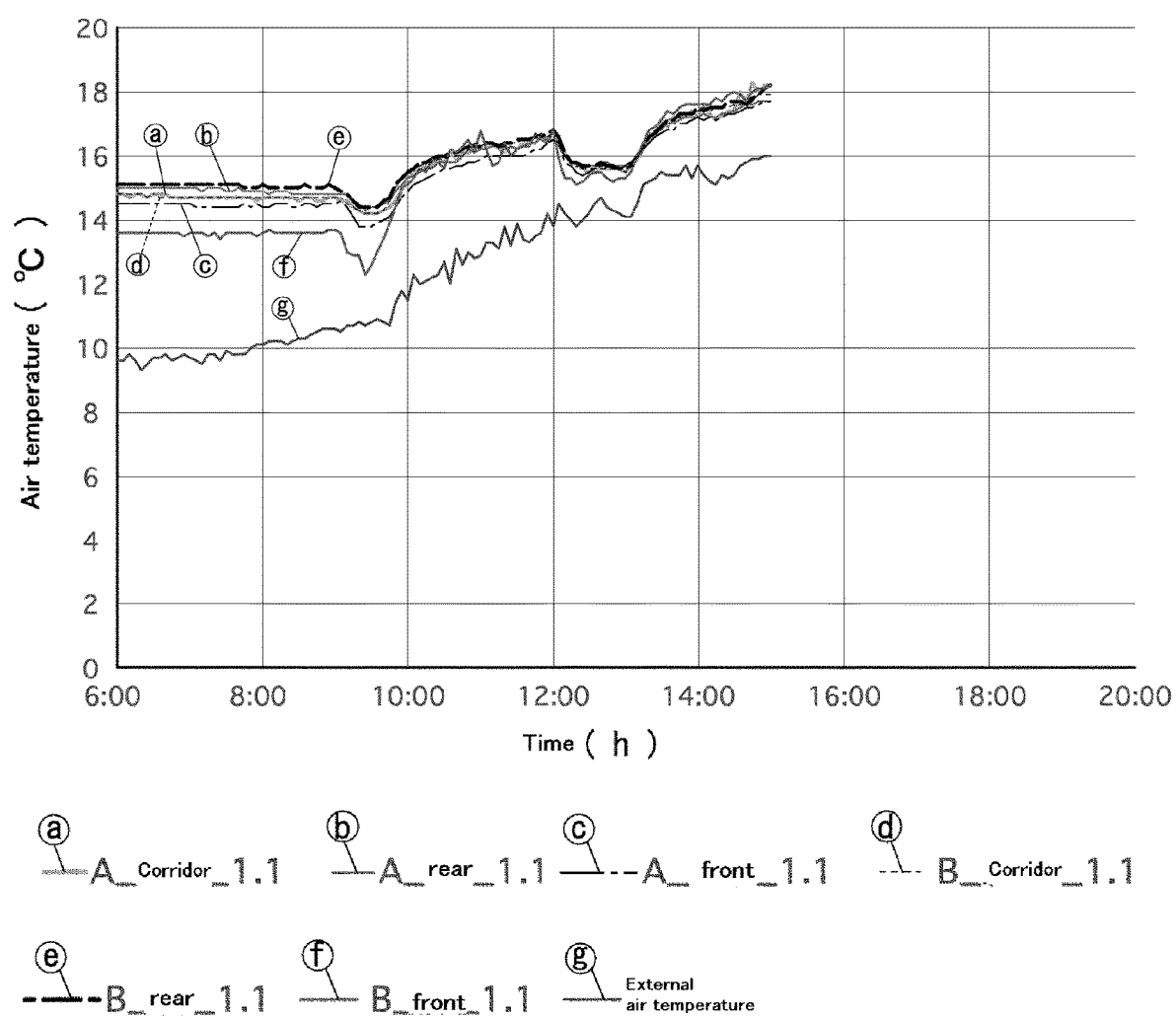
FIG. 8 is a graph showing results of a comparative test of change in temperature in the room installed with the ventilation air conditioning structure and the room not installed with the ventilation air conditioning structure.

FIG. 8 is referenced. FIG. 8 shows results of measurements made on Feb. 3, 2019 after installation of the ventilation air conditioning structure or the ventilation apparatus. That day was a holiday and with both the classroom A and the classroom B, a classroom without students and teachers was used. Also, with both the classroom A and the classroom B, the windows, etc., were completely shut and the air conditioner 2 was used. Also, in both the classroom A and the classroom B, the air exhausting apparatus was used at the "strong" setting.

Temperature changes in the classroom A and the classroom B are shown in the graph shown in FIG. 8, and the temperature changes measured in each of a vicinity of the second wall portion 13 in the classroom A (circled a shown in FIG. 8), a vicinity of the fourth wall portion 15 in the classroom A (circled b shown in FIG. 8), and a vicinity of the third wall portion 14 in the classroom A (circled c shown in FIG. 8) and the temperature changes measured in each of a vicinity of a second wall portion in the classroom B (circled d shown in FIG. 8), a vicinity of a fourth wall portion in the classroom B (circled e shown in FIG. 8), and a vicinity of a third wall portion in the classroom B (circled f shown in FIG. 8) are shown.

For the temperature measurements at the respective portions and also for measurement at the outdoors of the classroom A and the classroom B, a temperature measuring device was positioned at a height of 1.1 meters from the floor portion (a height aligned with a head portion or a chest portion of a student when seated) at a central portion in the case of the second wall portion 13, in a vicinity of the air supply opening 121 in the case of the third wall portion 14, and in a vicinity of the air exhaust opening 122 in the case of the fourth wall portion 15, respectively, and measurements were made every 5 minutes.

(Discussion of Results of Test 2)

According to the graph shown in FIG. 8, with the classroom A, results were such that the temperatures measured in the vicinity of the second wall portion 13 and the vicinity of the fourth wall portion 15 respectively transitioned at substantially the same numerical value and the temperature measured in the vicinity of the third wall portion 14 was slightly lower (lower by approximately 0.5 degrees than in the vicinity of the second wall portion 13 and the vicinity of the fourth wall portion 15). As a reason for why the temperature in the vicinity of the third wall portion 14 was low, closeness to the air supply opening 121 through which the external air that is lower than room temperature enters is surmised to be the cause.

However, in the classroom A, a difference between the temperatures measured in the vicinity of the second wall portion 13 and the vicinity of the fourth wall portion 15 and the temperature measured in the vicinity of the third wall portion 14 was only approximately 1 degree and it may be said that there is no large temperature difference inside the classroom A.

With the classroom B, results were such that whereas the temperatures measured in the vicinity of the second wall portion and the vicinity of the fourth wall portion respectively transitioned at substantially the same numerical value, the temperature measured in the vicinity of the third wall portion was considerably lower (lower by approximately 1.3 degrees than in the vicinity of the second wall portion and the vicinity of the fourth wall portion). As in the case of the classroom A, as a reason for why the temperature in the vicinity of the third wall portion in the classroom B was low, closeness to the air supply opening through which the external air that is lower than room temperature enters is surmised to be the cause.

Further, the measured temperature in the vicinity of the third wall portion in the classroom B was lowest among the measured temperatures of room interiors and the measured temperature in the vicinity of the third wall portion in the classroom B was approximately 1 degree lower than the measured temperature in the vicinity of the third wall portion 14 in the classroom A. Also, from a start of experiment (6:00) until elapse of a predetermined time (9:40), average temperatures at respective portions of the classroom. A were higher than average temperatures at respective portions of the classroom B.

That is, with the classroom A that is equipped with the external-air conditioner 3, rise of the air conditioner 2 is fast and the environment is also such that there is little difference among the average temperatures of the respective parts in the classroom A. With this environment, discomfort due to a temperature difference being large depending on a seat of a person staying in the room (hereinafter referred to as "room occupant") is lightened and contribution to improvement of comfort of many room occupants is enabled.

(Test 3. Comparison Test of Electric Power Consumption Amount)

Figure 9:
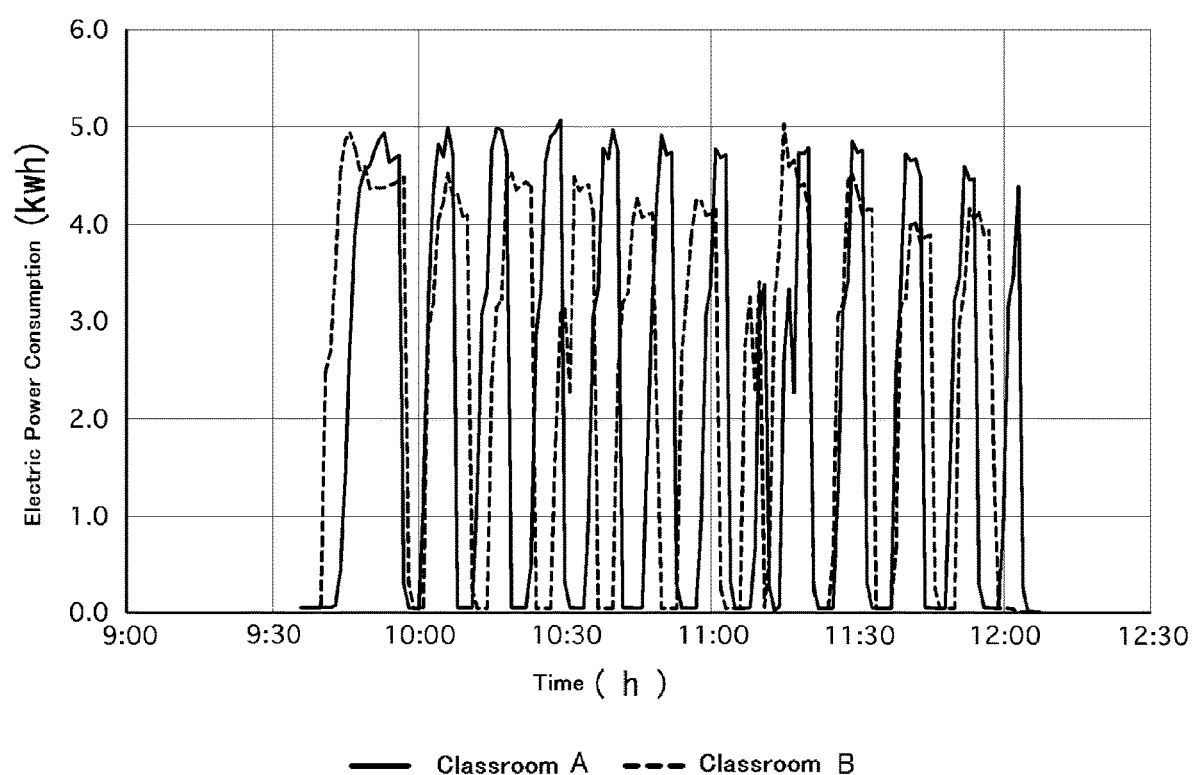
FIG. 9 is a graph showing results of a comparative test of electric power consumption amount of the room installed with the ventilation air conditioning structure and the room not installed with the ventilation air conditioning structure.

FIG. 9 is referenced. FIG. 9 shows results of measurements made on Feb. 3, 2019 after installation of the ventilation structures. That day was a holiday and with both the classroom A and the classroom B, a classroom without students and teachers was used. Also, with both the classroom A and the classroom B, the windows, etc., were completely shut and the air conditioner was used. Also, in both the classroom A and the classroom B, the air exhausting apparatus was used at the "strong" setting. The measurement time is from 9:20 to 12:10. Here, in the classroom A, a target temperature of the air conditioner was set to 22 degrees and in the classroom B, a target temperature of the air conditioner was set to 24 degrees. Thereby, a PMV (predicted mean vote) value and a room temperature at a point at a height of 1.1 meters from the floor portion were made substantially the same.

(Discussion of Results of Test 3)

With the abovementioned set temperatures, whereas a peak power was higher in the classroom A, averages were 1.96 kW in the classroom A and 2.30 kW in the classroom B.

From these results, it is surmised that in the classroom A, although an electric power consumption of the air conditioner 2 at rise time becomes high in accordance with circulating the refrigerant in the external-air conditioner 3, the room temperature is maintained by entry of the conditioned external air conditioned by the external-air conditioner 3 into the room interior (in other words, the room temperature is unlikely to decrease suddenly from the target temperature) and consequently, the electric power consumption amount in average was more suppressed than in the classroom B.

On the other hand, in the classroom B, due to the external-air conditioner 3 not being present, the external air that is large in temperature difference with respect to the room temperature entered the room interior continuously and decrease in the room temperature due to the external air was significant. It is therefore surmised that the air conditioner 2 ran frequently to reach the target temperature and consequently, the electric power consumption amount in average increased more than in the classroom A.

(Conclusion)

That is, in comparing the classroom A and the classroom B, the classroom A that is the ventilation air conditioning structure R1 excels in effects of enabling suppression of the electric power consumption amount of the air conditioner 2 and using the flow of the conditioned air sent from the air conditioner 2 to circulate the conditioned external air inside the room to make the temperature in the classroom uniform and perform ventilation that reduces the carbon dioxide concentration.

[Modification 1]

Although in the first embodiment, the air exhausting apparatus 5 is a ventilating fan, it may instead be a louver or other natural air exhausting means. Although unillustrated, a ventilation air conditioning structure (Modification 1) is arranged as a natural ventilation system with an external-air conditioner (the above-described external-air conditioner 3 that is a natural ventilation means is used) disposed at an air supply opening and an air exhausting apparatus that is a louver (natural ventilation means) disposed at an air exhaust opening. According to the ventilation air conditioning structure of Modification 1, since a fan, etc., that runs is not present, electric power consumption related to ventilation does not occur and also, a structure can be arranged that does not require maintenance of a fan. Quietness is also high.

Second Embodiment

Figure 10:
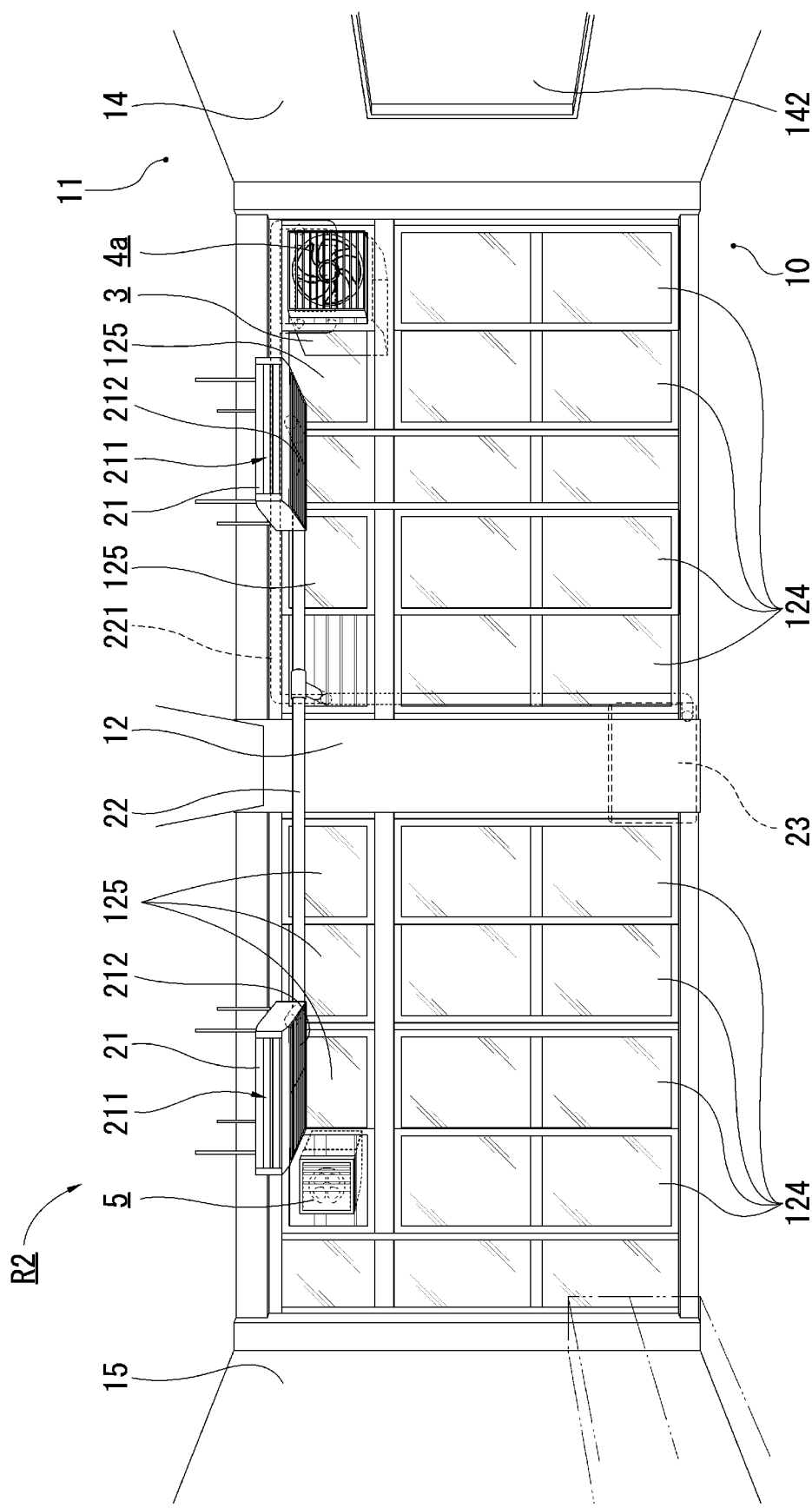
FIG. 10 is a perspective view of another ventilation air conditioning structure (second embodiment) of the present invention and shows a first wall portion as viewed from a direction of a second wall portion.
Figure 11A:
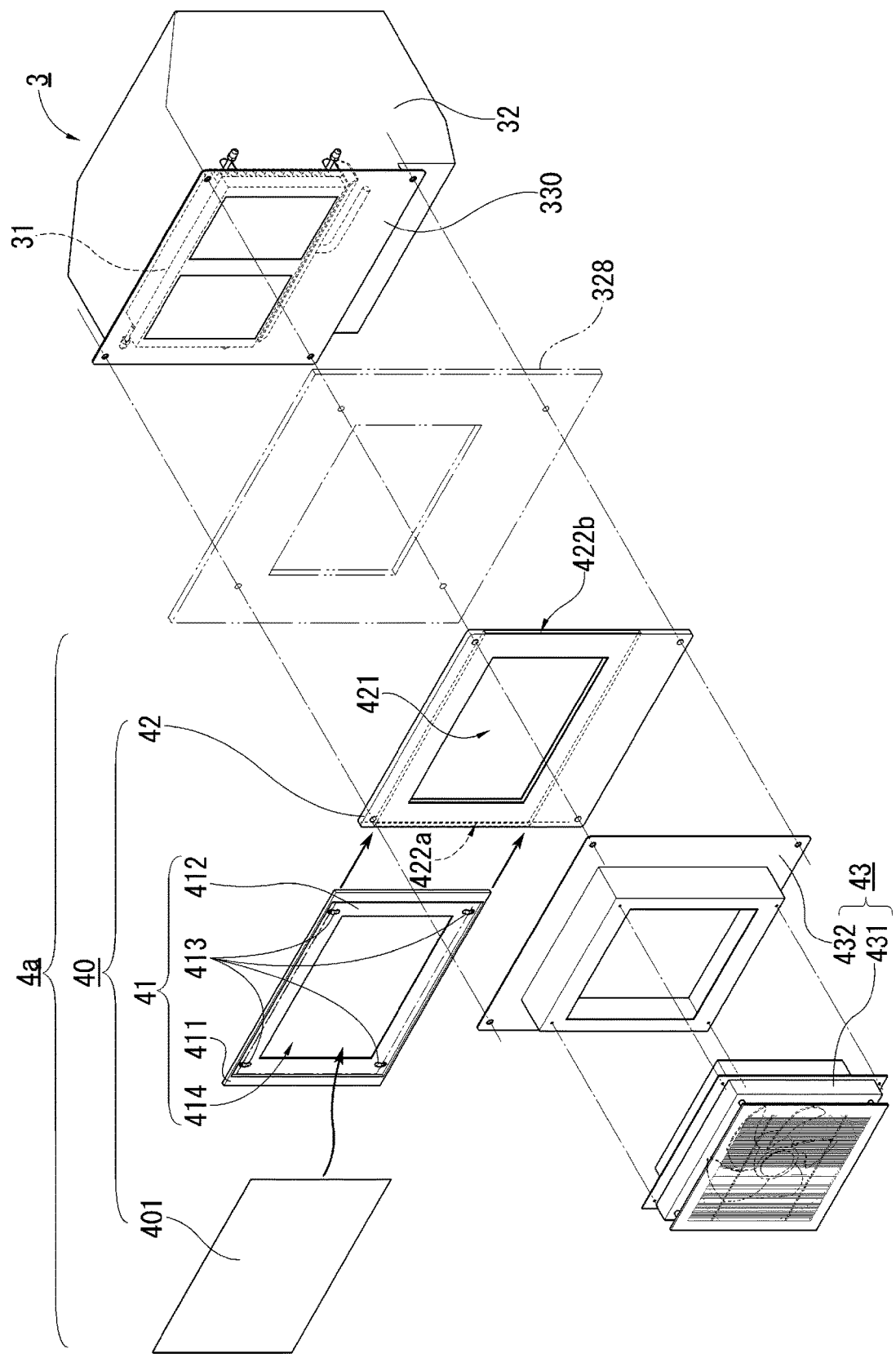
FIG. 11A is an exploded perspective view (1) of an air supplying fan portion in the ventilation air conditioning structure shown in FIG. 10.

FIG. 10 and FIG. 11A are referenced. A ventilation air conditioning structure R2 shown in FIG. 10 is another embodiment (second embodiment) of the ventilation air conditioning structure R1. Here, the ventilation air conditioning structure R2 is the same as the ventilation air conditioning structure R1 besides portions described below and therefore just differences shall be described, parts in common shall be provided with the same reference signs and description of structures thereof shall be omitted, and description of actions and effects in common shall also be omitted.

The ventilation air conditioning structure R2 has, at an indoor side of the air supply opening 121, an air filter apparatus 4a combining an air filter portion 40 and an air supplying fan portion 43 (see FIG. 10 and FIG. 11A). That is, for ventilation in the ventilation air conditioning structure R2, a class 1 ventilation (using mechanical ventilation for both air supplying and air exhausting) system is arranged by the air supplying fan portion 43 that is a forced air supplying means and the air exhausting apparatus 5 that is a forced air exhausting means.

The air filter portion 40 is positioned between the base plate portion 330 and a fan main body mounting frame 432 to be described later and is arranged from a ventilation opening filter sheet 401, a holding body 41, and a supporting frame 42.

The holding body 41 has a frame portion 411 of rectangular frame shape that is positioned at a peripheral edge, a contacting portion 412 that is provided at an inner side of the frame portion 411 and is thinner in thickness than the frame portion 411, and (a total of four) sheet locking pieces 413 of spring shape that are provided in vicinities of respective corner portions of the contacting portion 412 and are each pivotable around a mounting shaft (reference symbol omitted) provided at one end side and is a structure with a rectangular opening portion 414 formed in a center of the contacting portion 412.

A net body (not shown) covering an opening part is stretched across the opening portion 414. By the net body, the ventilation opening filter sheet 401 can be supported such as to be unlikely to bend to a room interior side and fall off when an air flow of the conditioned external air is high. Also, a cross shaped or lattice shaped frame body may be used instead of the net body.

The supporting frame body 42 has a rectangular frame shape with a rectangular opening portion 421 formed from a central portion to an upper portion and an internal space in which the holding body 41 is fitted is formed in a periphery of the opening portion 421. The supporting frame body 42 has formed therein insertion openings 422*a* and 422*b* that communicate through from sides of the internal space and the insertion openings 422*a* and 422*b* are arranged to be of sizes enabling the holding body 41 to be placed in and out from either opening.

The opening portion 414 of the holding body 41 and the opening portion 421 of the supporting frame body 42 are of substantially the same size and are arranged to overlap exactly in a state where the holding body 41 is fitted in the supporting frame body 42.

The air supplying fan portion 43 is arranged from a fan main body 431 and the fan main body mounting frame 432 of rectangular frame shape with which a front side and a back side are opened and a periphery is of flange shape and the fan main body 431 is mountable at an opening portion at a center.

The ventilation air conditioning structure R2 enables a class 1 ventilation to be implemented as a ventilation system inside the room 1 and thus enables stable ventilation to be secured.

The air supplying fan portion 43 enables fan cleaning and other maintenance work to be performed inside the room 1 and is thus high in convenience. Similarly, the air filter portion 40 also enables replacement of the ventilation opening filter sheet 401 and other work to be performed inside the room 1 such that maintainability is improved further and is thus high in convenience.

The ventilation opening filter sheet 401 is capable of preventing entry of dust, etc., contained in the conditioned external air that passes through. Also, by being replaceable, the ventilation opening filter sheet 401 can be exchanged from time to time such that clogging does not occur. Yet further, the ventilation opening filter sheet 401 is easy to attach and detach to and from the holding body 41, enabling even a user to perform this without accompanying any special work and enables operation cost to be suppressed.

The holding body 41 is capable of locking edge portions of the ventilation opening filter sheet 401 to put and hold it in a spread state and is capable of holding it detachably.

The supporting frame body 42 is capable of supporting the holding body 41 that has been inserted. The holding body 41 can thereby be supported such that the ventilation opening filter sheet 401 would not deviate from a predetermined position and allow air that is not filtered by the ventilation opening filter sheet 401 to pass through. Also, by enabling the holding body 41 to be inserted and removed from the sides, the supporting frame body 42 enables the work of replacing the ventilation opening filter sheet 401 to be performed easily and simply.

[Modification 2]

Figure 12:
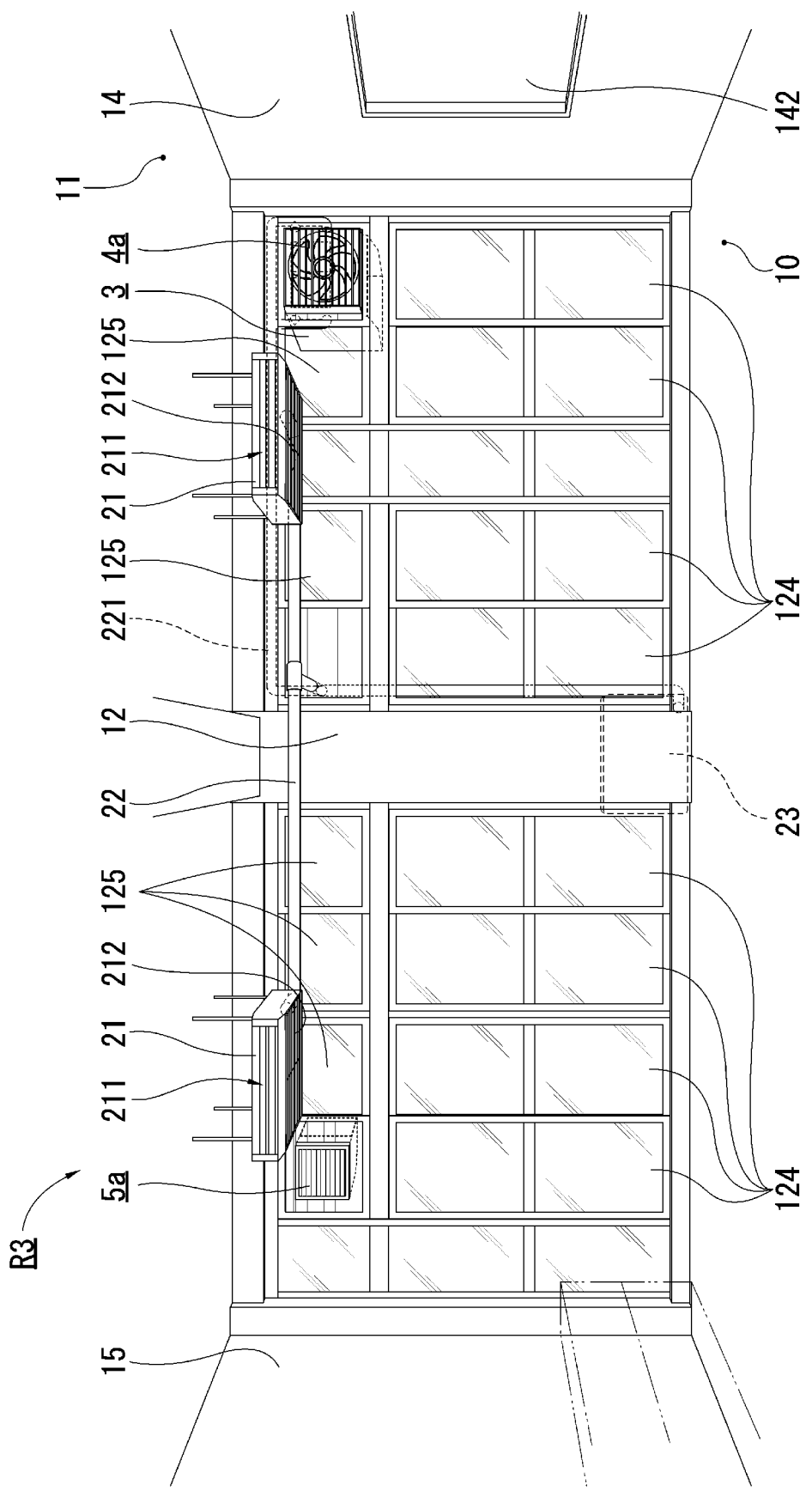
FIG. 12 is a perspective view of a modification (Modification 2) of the ventilation air conditioning structure shown in FIG. 10 and shows a first wall portion as viewed from a direction of a second wall portion.

Although in the second embodiment, the air exhausting apparatus 5 is a ventilating fan, it may instead be a louver or other natural air exhausting means. A ventilation air conditioning structure R3 (Modification 2) shown in FIG. 12 is arranged as a class 2 ventilation system (using mechanical ventilation for air supplying and natural ventilation for air exhausting) with the air supplying fan portion 43 (forced ventilation means) disposed at an air supply opening and an air exhausting apparatus 5*a* that is a louver (natural ventilation means) disposed at the air exhaust opening 122. Even with the ventilation air conditioning structure R3, not just the air supplying fan portion 43 but the air filter apparatus 4*a* may also be disposed.

According to the ventilation air conditioning structure R3, since a fan, etc., that runs is not present in the air exhausting apparatus 5*a*, electric power consumption related to ventilation does not occur and also, if the room 1 is a structure with airtightness, the room interior can be kept at a higher pressure than the external air and can be arranged as a structure suited as a cleanroom, a sickroom, etc.

[Modification 3]

Although in the second embodiment, the heat exchangers 31 are arranged to be housed in the casing 32, the heat exchangers 31 do not necessarily have to be housed in the casing 32. For example, as shown in FIG. 11B, a heat exchanger unit 33 that houses the heat exchangers 31 may be provided and this heat exchanger unit 33 may be mounted to the casing 32.

Here, although Modification 3 (arrangement of the heat exchanger unit 33) is inferior in terms of realizing space saving in comparison to the case where the heat exchangers 31 are housed in the casing 32, a general purpose casing 33 can be used as it is and there is no need to apply various processing for housing. Also, accommodation is possible even in cases where a housing space cannot be secured in the casing 32, as in a structure where a fire damper structure is provided in the casing 32, etc.

Also, when Modification 3 is adopted, it is preferable to adhere butyl tape to front and rear surfaces (casing 32 side and mounting frame body 328 side) of the heat exchanger unit 33 to secure airtightness of amounting portion, prevent air leakage, and prevent water leakage of rainwater (however, the arrangement is not restricted to butyl tape as long as airtightness can be secured).

Figure 11B:
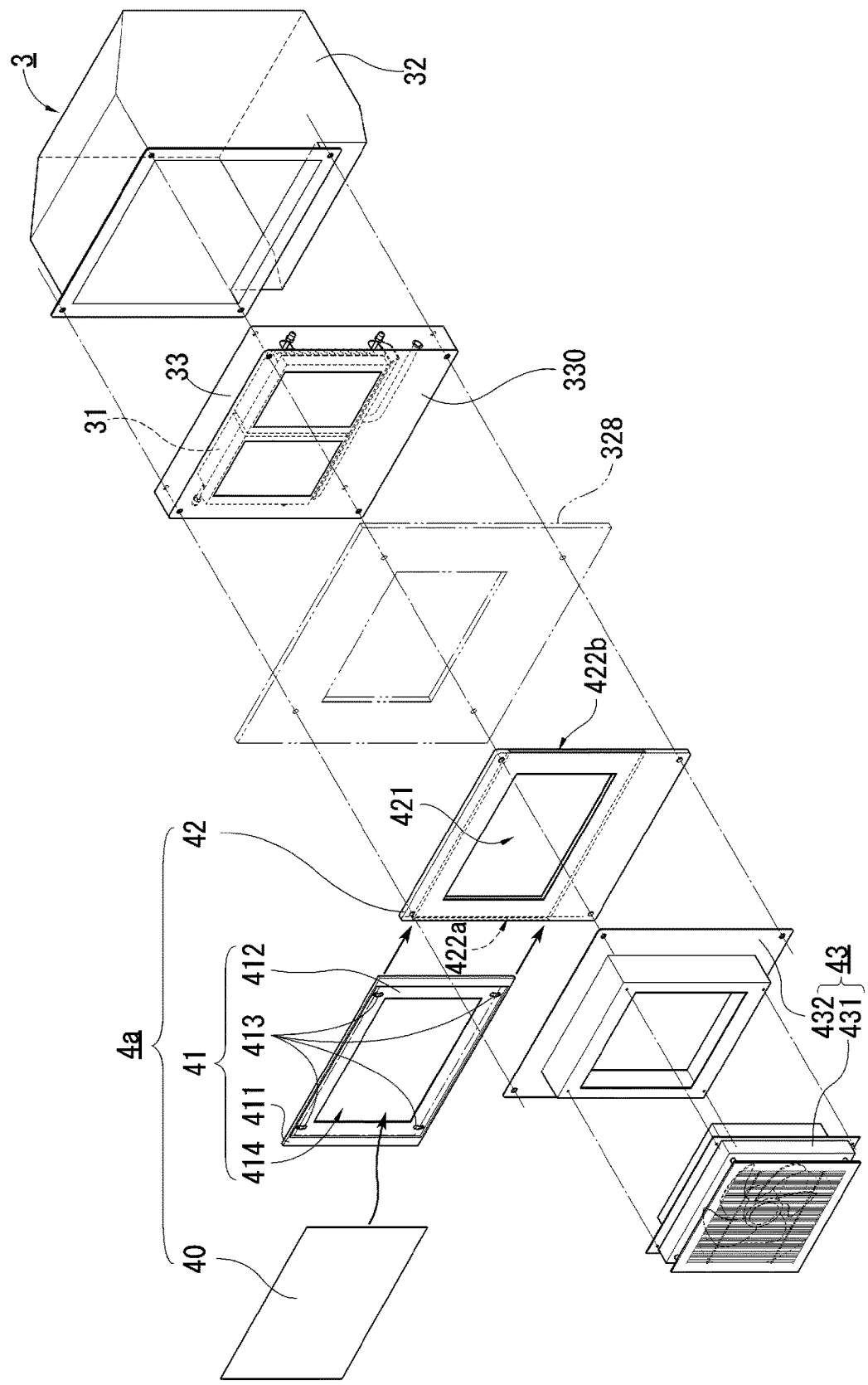
FIG. 11B is an exploded perspective view (2) of the air supplying fan portion in the ventilation air conditioning structure shown in FIG. 10.

Further, Modification 3 (that is, an arrangement where the heat exchangers 31 are housed in the heat exchanger unit 33 as in FIG. 11B), may be adopted in a system using natural ventilation for air supplying, such as the first embodiment.

Figure 13:
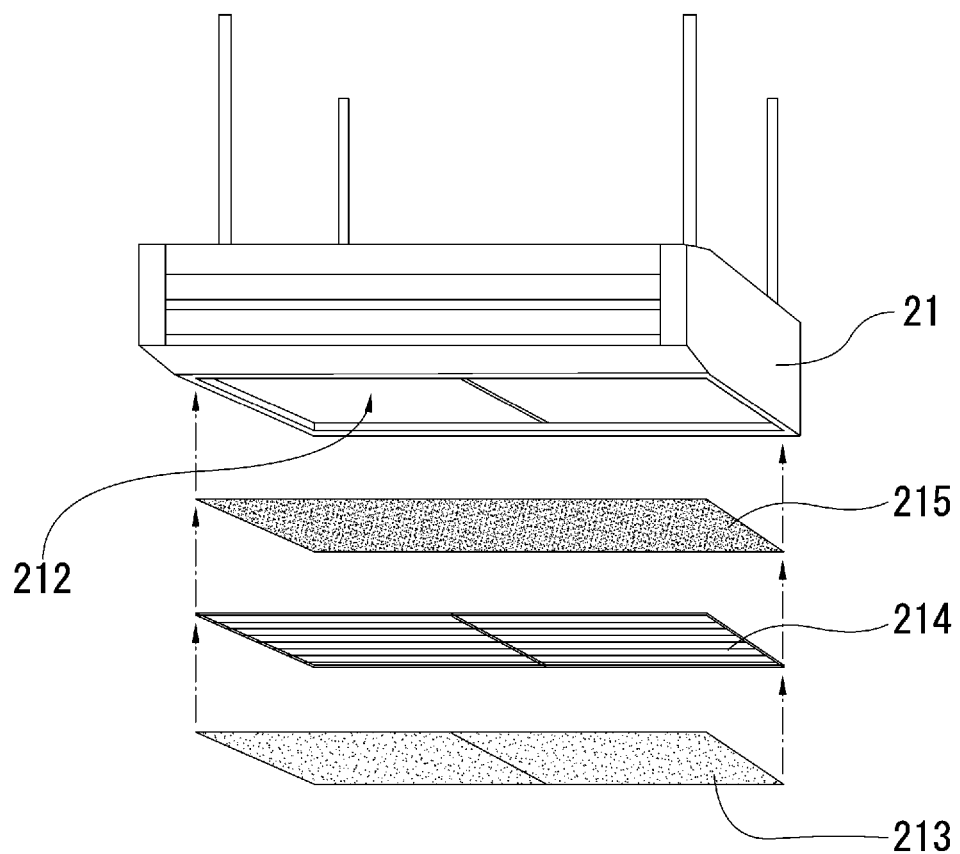
FIG. 13 is an exploded perspective view of an air intake part of a room interior unit.
Figure 14:
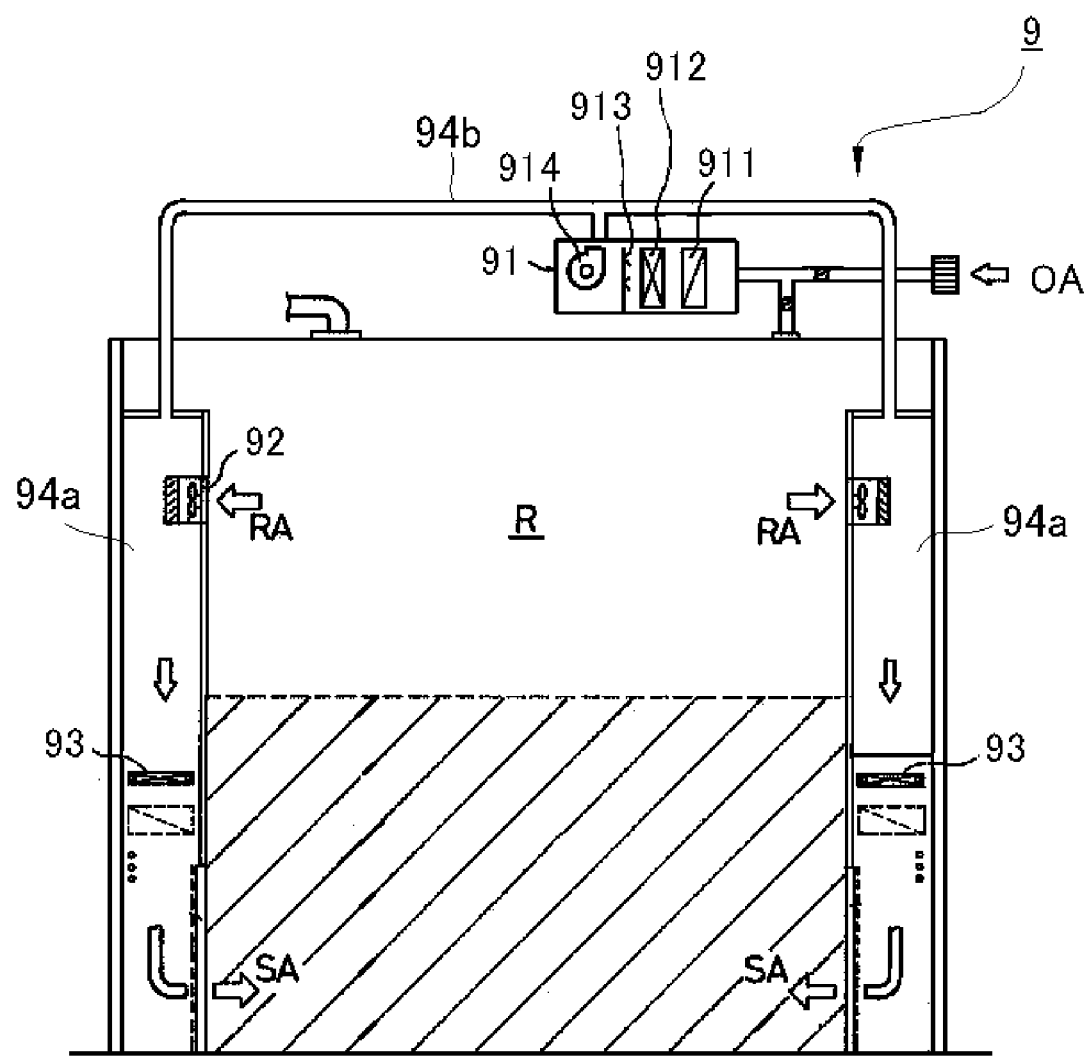
FIG. 14 shows an air conditioning equipment described in Patent Literature 1.

In Embodiments 1 and 2 and Modifications 1 to 3, an air intake opening filter sheet 213 containing copper oxide as an antiviral metal component may be positioned at a front surface of the air intake opening 212 of the room interior unit 21 as shown in FIG. 13. It is possible to inactivate bacteria and virus suspended in air taken in from the air intake opening 212 by the air intake opening filter sheet 213. That is, copper oxide, which is an oxide of copper, is capable of being put in a state (of a radical) having an unpaired electron in accordance with oxidation number even under ordinary temperature and ordinary pressure without irradiation of light and heating being performed.

An unpaired electron of a radical is basically unstable and is known to take away or give an electron from/to an atom, molecule, etc., that comes in contact with the radical. A radical is thus capable of modifying a molecule that constitutes a contaminant such as a bacteria, virus, etc., to perform sterilization and inactivation of virus.

Also, the air intake opening filter sheet 213 is positioned at the front surface of the air intake opening 212 and it is thus possible to make a visual judgment with a guideline for replacement when the air intake opening filter sheet 213 becomes degraded and even when replacement is to be performed, it is possible to perform it easily without having to disassemble the room interior unit 21. Further, it is possible to capture a large portion of bacteria, virus, and other impurities by the air intake opening filter sheet 213 and it is thus possible to prevent degradation of an internal filter 215 positioned in an interior of the room interior unit 21.

Here, the antiviral metal component is not restricted to the copper oxide mentioned above. For example, it can be selected from one of silver oxide, iron oxide, and manganese oxide. However, according to results examined by the inventor, it was confirmed that copper oxide is highest in antiviral effect.

Also, the antiviral metal component may be contained not just in the air intake opening filter sheet 213 described above but also, for example, in the ventilation opening filter sheet 401 that constitutes the air filter portion 40.

The external-air conditioner 3 in Embodiments 1 and 2 and Modifications 1 to 3 may be a structure where the casing 32 is provided with a fire damper. With the structure where the casing 32 is provided with the fire damper, the air supply opening is shut when fire occurs to enable spread of fire to be suppressed.

The air exhausting apparatus 5 and the air supplying fan portion 43 in Embodiments 1 and 2 and Modifications 1 to 3 may be structures that are provided with a $CO_2$ sensor and are put in automatic operation. By detecting the $CO_2$ concentration in the room by the $CO_2$ sensor and arranging such that operation is started when a certain concentration is reached and operation is stopped when the $CO_2$ concentration falls below the certain concentration, the $CO_2$ concentration in the room can be controlled, and by not performing operation when unnecessary, contribution to energy saving can be achieved and quietness can be improved.

Although the respective heat exchangers 31 of the external-air conditioner 3 in Embodiments 1 and 2 and Modifications 1 to 3 have separate (parallel) systems as the refrigerant flow passages, the present invention is not restricted thereto and, for example, although an operation load of a room exterior unit increases, the refrigerant flow passages may be of the same (serial) system.

The terms and the expressions used in the present description and in the claims are used only descriptively, are not restrictive by any means, and are not intended to exclude features mentioned in the present description and in the claims and terms and expressions equivalent to part of the features. Also, various modifications can obviously be made within the scope of the technical philosophy of the present invention. Also, the terms "the first," "the second," etc., do not mean a grade or importance and are used to distinguish one element from other elements.

LIST OF REFERENCE CHARACTERS

R1, R2, R3 Ventilation air conditioning structure
1 Room
10 Floor portion
11 Ceiling portion
12 First wall portion
121 Air supply opening
122 Air exhaust opening
123 Veranda
124 Double sliding window
125 Transom window
13 Second wall portion
130 Corridor
131 Entrance/exit
14 Third wall portion
141 Podium
142 Display device
15 Fourth wall portion
2 Air conditioner
21 Room interior unit
211 Air sending opening
212 Air intake opening
213 Air intake opening filter sheet
214 Front surface panel
215 Internal filter
22 Refrigerant piping
221 Branched pipe
222a, 222b Rebranched pipe
23 Room exterior unit
3 External-air conditioner
31 Heat exchanger
311 First inlet/outlet pipe
312 First joint portion
313 Second inlet/outlet pipe
314 Second joint portion
315 Partitioning portion
316 Locking screw
317 Water drain hole
32 Casing
320 Peripheral wall body
321 Introduction opening
322 Delivery opening
323 Base body
324 Front wall portion
325 Side wall portion
326 Flange portion
327 Heat insulation structure portion
328 Mounting frame body
329 Opening portion
330 Base plate portion
332 Threaded or other insertion hole
340 Heat exchanger holding structure portion
341 Locking notch
350 Water receiver portion
351 Water receiver supporting portion
352 Drain pan
353 Drain water passage
354 Water drain hole
33 Heat exchanger unit
4, 4a Air filter apparatus
40 Air filter portion
401 Ventilation opening filter sheet
41 Holding body
411 Frame portion
412 Contacting portion
413 Sheet locking piece
414 Opening portion
42 Supporting frame body
421 Opening portion
422a, 422b Insertion opening
43 Air supplying fan portion
431 Fan main body
432 Fan main body mounting frame
5, 5a Air exhausting apparatus
9 Air conditioning equipment
OA External air
91 External-air conditioner
911 Cooling coil
912 Heating coil
913 Humidifier
914 Blower
92 Return air intake
93 Sensible heat exchanger 94a, 94b Circulation passage
RA Air supplied into room
SA Heat-exchanged air
R Room interior

The invention claimed is:

1. A ventilation air conditioning structure comprising: a room structure body including wall portions partitioning an interior and an exterior of a room inside a building, wherein at least one of the wall portions is an outer wall portion that is in contact with the outdoors, the outer wall portion having a first ventilation opening formed in a vicinity of one of adjacent wall portions and a second ventilation opening formed in a vicinity of another of the adjacent wall portions; an air conditioner including a room interior unit, a refrigerant piping, and a room exterior unit, wherein the room interior unit is disposed inside the room structure body, wherein the air conditioner is capable of sending air, taken in from an air intake opening, in a direction of a wall portion facing the outer wall portion, wherein the refrigerant piping connects the room interior unit and a the room exterior unit; and an external-air conditioner that is disposed at an outdoor side of the outer wall portion, the external-air conditioner including: a heat exchanger provided in a refrigerant circuit of the air conditioner via a branched pipe that is branched from the refrigerant piping of the air conditioner; and a casing that houses the heat exchanger, wherein a first opening portion opening is formed in the casing in a downward direction, wherein a second opening portion opening is formed in the casing at a back portion towards an outer wall portion direction, and wherein the second opening portion is communicative with either the first ventilation opening, wherein the room interior unit is disposed in a vicinity of the outer wall portion and includes an air intake opening and an air sending opening such that the air intake opening faces a floor of the room and the air sending opening is directed to the wall portion facing the outer wall portion, wherein the room interior unit is positioned near the first ventilation opening such that external air entering from the first ventilation opening through the external-air conditioner rides on a flow of air blown out from the room interior unit and mixes with it the external air.

2. The ventilation air conditioning structure according to claim 1, wherein the external-air conditioner is arranged such that a plurality of the heat exchangers are disposed in parallel in the same direction and configured as being substantially non-overlapping mutually in an air passage direction,
wherein refrigerant flow passages of the heat exchangers are respectively separate systems, and
wherein a refrigerant is supplied according to each of the systems by rebranched pipes that are further branched from the branched pipe.

3. The ventilation air conditioning structure according to claim 1, further comprising:
an air filter apparatus including:
a ventilation opening filter sheet;
a holding body that includes a frame body with which a central region is opened and a holding portion provided at a periphery of the frame body that locks and detachably holds an edge portion of the ventilation opening filter sheet; and
a supporting frame body that is arranged to enable the holding body to be put in and taken out from a side, wherein the supporting frame body is constructed to support the holding body that has been put in, and wherein the supporting frame body is provided at a room interior side of whichever of the first ventilation opening or the second ventilation opening the external-air conditioner is installed.

4. The ventilation air conditioning structure according to claim 3, wherein the ventilation opening filter sheet includes an antiviral metal component of at least one type selected from among copper oxide, silver oxide, iron oxide, and manganese oxide.

5. The ventilation air conditioning structure according to any one of claim 1, wherein the air intake opening of the room interior unit is provided with an air intake opening filter sheet, and
wherein the air intake opening filter sheet includes an antiviral metal component of at least one type selected from among copper oxide, silver oxide, iron oxide, and manganese oxide.

6. The ventilation air conditioning structure according to any one of claim 1, wherein a podium is installed in a vicinity of the wall portion adjacent to whichever of the first ventilation opening or the second ventilation opening the external-air conditioner is installed.

7. The ventilation air conditioning structure according to any one of claim 1, wherein a forced air supplying apparatus is disposed at an indoor side of whichever of the first ventilation opening or the second ventilation opening the external-air conditioner is installed.

8. The ventilation air conditioning structure according to any one of claim 1, wherein a forced air exhausting apparatus is disposed at an indoor side of whichever of the first ventilation opening or the second ventilation opening the external-air conditioner is not installed.

9. A ventilation air conditioning structure comprising: an air conditioner which includes a room interior unit disposed inside a room structure body that has wall portions partitioning an interior and an exterior of a room inside a building, wherein at least one of the wall portions is an outer wall portion that is in contact with the outdoors, the outer wall portion having a first ventilation opening formed in a vicinity of one of adjacent wall portions and a second ventilation opening formed in a vicinity of another of the adjacent wall portions, and wherein the air conditioner is capable of sending air in a direction of a wall portion that faces the outer wall portion via a refrigerant piping that connects the room interior unit and a room exterior unit; and an external-air conditioner that is disposed at an outdoor side of the outer wall portion, the external-air conditioner including: a heat exchanger provided in a refrigerant circuit of the air conditioner via a branched pipe branched from the refrigerant piping of the air conditioner; and a casing that houses the heat exchanger, wherein a first opening portion is formed in the casing, the first opening portion opening in a downward direction, wherein a second opening portion is formed in the casing, the second opening portion opening at a back portion towards an outer wall portion direction, and wherein the second opening portion is communicative with the first ventilation opening, wherein the room interior unit is disposed in a vicinity of the outer wall portion and includes an air intake opening and an air sending opening such that the air intake opening faces a floor of the room and the air sending opening is directed to the wall portion facing the outer wall portion, wherein the room interior unit is positioned near the first ventilation opening such that external air entering from the first ventilation opening through the external-air conditioner rides on a flow of air blown out from the room interior unit and mixes with it the external air.

10. A ventilation air conditioning method comprising: a first step of using a heat exchanger that is connected to and supplied with a refrigerant from a refrigerant circuit of an air conditioner with a room interior unit disposed inside a room within a building to heat or cool external air introduced into a casing of an external-air conditioner, wherein the external-air conditioner having the heat exchanger is installed at an outdoor side of an outer wall portion in contact with the outdoors of the room; and a second step of introducing the heated or cooled external air into the room via a first ventilation opening that is formed in a portion of the outer wall portion in a vicinity of one of adjacent wall portions, wherein the first ventilation opening is communicative with the casing, wherein the room interior unit sends air in a direction of a wall portion facing the outer wall portion to make the air inside the room and the introduced external air undergo convection and mixing to form mixed air, and wherein the mixed air is exhausted from a second ventilation opening formed in a portion of the outer wall portion in a vicinity of another of the adjacent wall portions, wherein the air conditioner including the room interior unit, a refrigerant piping, and a room exterior unit such that the room interior unit is disposed inside a room structure body and the refrigerant piping connects the room interior unit and the room exterior unit, wherein the room interior unit is disposed in a vicinity of the outer wall portion and includes an air intake opening and an air sending opening such that the air intake opening faces a floor of the room and the air sending opening is directed to the wall portion facing the outer wall portion, wherein the room interior unit is positioned near the first ventilation opening such that external air entering from the first ventilation opening through the external-air conditioner rides on a flow of air blown out from the room interior unit and mixes with it the external air.

\* \* \* \* \*